US012580333B2

(12) United States Patent
Tamaki

(10) Patent No.: US 12,580,333 B2
(45) Date of Patent: Mar. 17, 2026

(54) FLAT CONDUCTOR ELECTRIC CONNECTOR

(71) Applicant: HIROSE ELECTRIC CO., LTD., Kanagawa (JP)

(72) Inventor: Shoichiro Tamaki, Kanagawa (JP)

(73) Assignee: HIROSE ELECTRIC CO., LTD., Kanagawa (JP)

(*) Notice: Subject to any disclaimer, the term of this patent is extended or adjusted under 35 U.S.C. 154(b) by 275 days.

(21) Appl. No.: 18/497,504

(22) Filed: Oct. 30, 2023

(65) Prior Publication Data

US 2024/0145965 A1 May 2, 2024

(30) Foreign Application Priority Data

Nov. 1, 2022 (JP) ................................ 2022-175400

(51) Int. Cl.

*H01R 12/79* (2011.01)
*H01R 12/88* (2011.01)
*H01R 12/89* (2011.01)
*H01R 13/639* (2006.01)

(52) U.S. Cl.

CPC ............. *H01R 12/79* (2013.01); *H01R 12/88* (2013.01); *H01R 12/89* (2013.01); *H01R 13/639* (2013.01)

(58) Field of Classification Search

CPC ............................ H01R 12/7068; H01R 12/79
See application file for complete search history.

(56) References Cited

U.S. PATENT DOCUMENTS

| | | | | | |
|---|---|---|---|---|---|
| 3,696,319 | A * | 10/1972 | Olsson | H01R 12/78 | 439/948 |
| 5,474,468 | A * | 12/1995 | Chishima | H01R 43/16 | 439/495 |
| 5,727,968 | A * | 3/1998 | Ito | H01R 12/777 | 439/495 |
| 6,250,959 | B1 * | 6/2001 | Yamaguchi | H01R 4/2412 | 439/578 |
| 7,040,917 | B2 * | 5/2006 | Yagi | H01R 13/658 | 439/495 |

(Continued)

FOREIGN PATENT DOCUMENTS

JP 6786356 B2 11/2020

*Primary Examiner* — Neil Abrams
(74) *Attorney, Agent, or Firm* — RANKIN, HILL & CLARK LLP

(57) ABSTRACT

A flat conductor electric connector to hold a flat conductor inserted in a front-back direction includes: terminals arrayed in a flat conductor width direction; and a housing holding the terminals. Each terminal includes an attachment portion attached, on one end side, in a fixed manner to the housing, a contact arm portion extending in the front-back direction on the other end side to contact a circuit portion of the flat conductor, and an elastically-displaceable elastic portion provided between the attachment portion and the contact arm portion. The elastic portion is elastically displaceable at least in one of the front-back direction, the terminal alignment direction, or an upper-lower direction which is a flat conductor thickness direction. The contact arm portion is elastically displaceable at least in the upper-lower direction. When the elastic portion is elastically displaced, the contact arm portion is displaceable together with the elastic portion.

8 Claims, 12 Drawing Sheets

(56) References Cited

U.S. PATENT DOCUMENTS

| | | | | |
|---|---|---|---|---|
| 7,467,970 | B2 * | 12/2008 | Ikuta | H01R 12/592 439/496 |
| 7,618,282 | B2 * | 11/2009 | Wu | H01R 12/592 439/496 |
| 10,348,014 | B2 * | 7/2019 | Ishii | H01R 12/774 |
| 12,244,086 | B2 * | 3/2025 | Cabañero | H01R 12/7005 |
| 2018/0123273 | A1 | 5/2018 | Ishii et al. | |
| 2024/0145964 | A1 * | 5/2024 | Tamaki | H01R 12/77 |
| 2024/0145965 | A1 * | 5/2024 | Tamaki | H01R 13/639 |

* cited by examiner

FLAT CONDUCTOR ELECTRIC CONNECTOR

CROSS-REFERENCE TO RELATED APPLICATION

This application claims priority from Japanese Patent Application No. 2022-175400 filed with the Japan Patent Office on Nov. 1, 2022, the entire content of which is hereby incorporated by reference.

BACKGROUND

1. Technical Field

The present disclosure relates to a flat conductor electric connector.

2. Related Art

For example, an electric connector disclosed in Japanese Patent No. 6786356 has been known as a flat conductor electric connector. A flat conductor (flat cable) extending in a front-back direction is inserted and connected forward to the electric connector. A slider attached to a housing holding a plurality of terminals maintains a state of the flat conductor being connected to the connector. Specifically, the slider is attached to the housing from the back so as to move in the front-back direction between a retreat position at which removal of the flat conductor is allowed and an advance position at which removal of the flat conductor is blocked.

The terminal includes a support portion extending an upper-lower direction in a front portion of the housing, a connection portion extending outward of the housing from the lower end of the support portion and connected to a mount surface of a circuit board, an upper arm portion extending backward from an upper portion of the support portion, and first and second lower arm portions extending backward from a lower portion of the support portion and formed elastically displaceable in the upper-lower direction. The terminal is press-fitted in the housing from the front, and is held on the housing at a protrusion formed at a front end portion of the upper arm portion. The first lower arm portion and the second lower arm portion have different lengths in the front-back direction. Moreover, each of the first lower arm portion and the second lower arm portion is contactable, at a contact portion provided at the back end, with a circuit portion of the flat conductor with contact pressure.

SUMMARY

A flat conductor electric connector according to an embodiment of the present disclosure is configured such that a flat conductor extending in a front-back direction is inserted and connected forward to the flat conductor electric connector, the flat conductor electric connector including: a plurality of terminals arrayed in a flat conductor width direction which is a terminal alignment direction; and a housing holding the plurality of terminals, in which each terminal includes an attachment portion attached, on one end side, in a fixed manner to the housing, a contact arm portion extending in the front-back direction on the other end side and contacting a circuit portion of the flat conductor, and an elastically-displaceable elastic portion provided between the attachment portion and the contact arm portion, the elastic portion is elastically displaceable at least in one of the front-back direction, the terminal alignment direction, or an upper-lower direction which is a flat conductor thickness direction, and the contact arm portion is elastically displaceable at least in the upper-lower direction, and when the elastic portion is elastically displaced, is displaceable together with the elastic portion.

DETAILED DESCRIPTION

Figure 1:
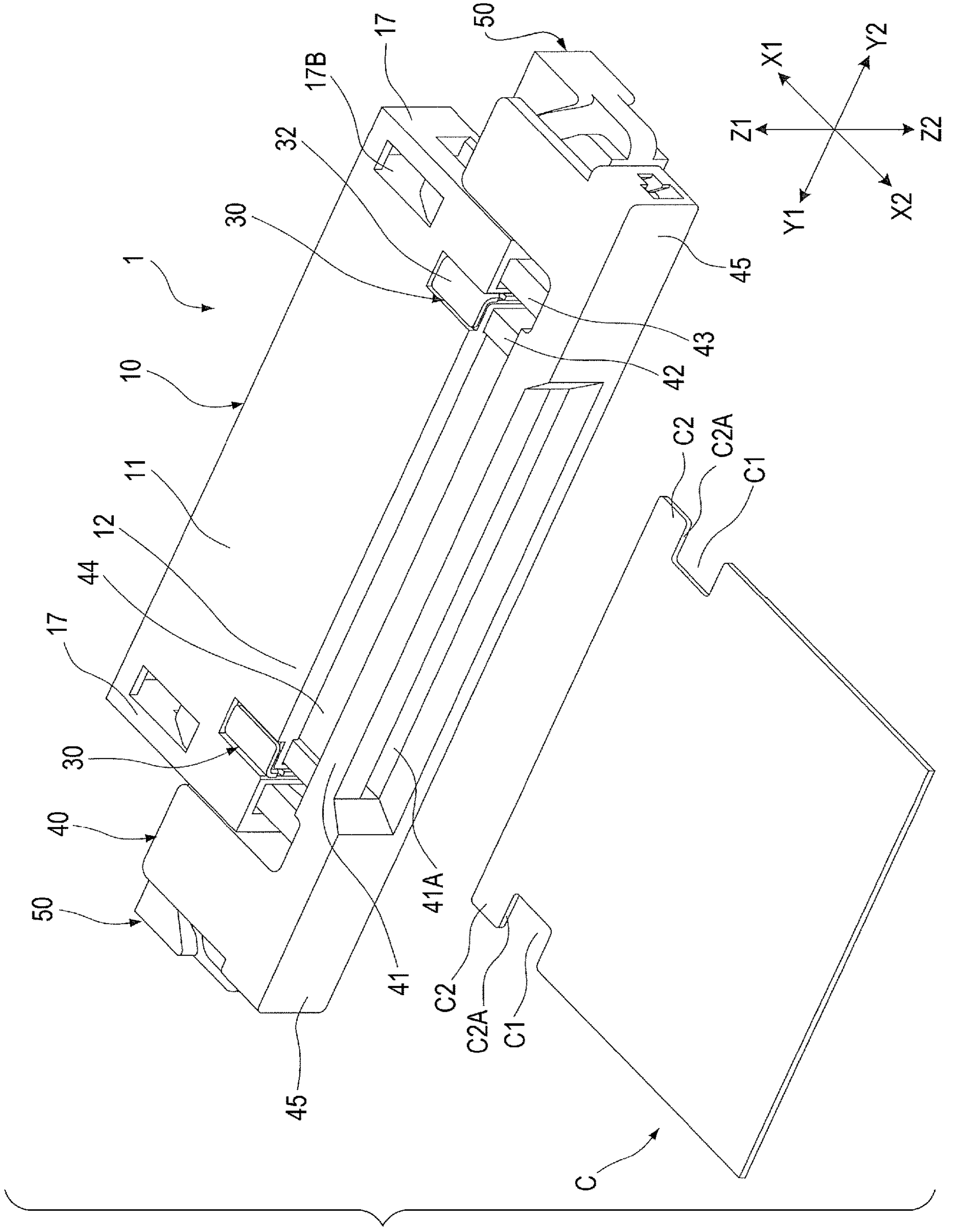
FIG. 1 is a perspective view showing, together with a flat conductor, a flat conductor electric connector according to the present embodiment, and shows a state before insertion of the flat conductor.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a case where the electric connector of Japanese Patent No. 6786356 is used under an environment where vibration easily occurs, the first and second lower arm portions of the terminal elastically displace so as to follow vibration from the outside of the electric connector. Thus, contact between the contact portion of the terminal and the circuit portion of the flat conductor is maintained. The extent to which the first lower arm portion and the second lower arm portion can follow the above-described vibration depends on the lengths of the first lower arm portion and the second lower arm portion. If elastic displacement of the first lower arm portion and the second lower arm portion cannot follow due to a high frequency of the vibration, the contact portion of the terminal and the circuit portion of the flat conductor finely slidably contact each other. Due to repetition of such fine sliding contact, the contact portion and the circuit portion are worn out. Metal powder caused due to such wear is accumulated in the vicinity of the portion of contact between the contact portion and the circuit portion. Such metal powder is oxidized, leading to an adverse effect on electric conduction between the contact portion and the circuit portion.

In order to cope with such a situation, the present disclosure is intended to provide a flat conductor electric connector configured so that favorable contact between a terminal and a flat conductor can be easily maintained.

(1) A flat conductor extending in a front-back direction is inserted and connected forward to a flat conductor electric connector according to one aspect of an embodiment of the present disclosure.

In the present disclosure, the flat conductor electric connector is configured such that a flat conductor extending in a front-back direction is inserted and connected forward to the flat conductor electric connector, the flat conductor electric connector including: a plurality of terminals arrayed in a flat conductor width direction which is a terminal alignment direction; and a housing holding the plurality of terminals, in which each terminal includes an attachment portion attached, on one end side, in a fixed manner to the housing, a contact arm portion extending in the front-back direction on the other end side and contacting a circuit portion of the flat conductor, and an elastically-displaceable elastic portion provided between the attachment portion and the contact arm portion, the elastic portion is elastically displaceable at least in one of the front-back direction, the terminal alignment direction, or an upper-lower direction which is a flat conductor thickness direction, and the contact arm portion is elastically displaceable at least in the upper-lower direction, and when the elastic portion is elastically displaced, is displaceable together with the elastic portion.

The terminal used for the present embodiment includes the elastic portion between the attachment portion and the contact arm portion. The elastic portion is elastically displaceable at least in one of the front-back direction, the terminal alignment direction, or the upper-lower direction. Thus, when the electric connector according to the present embodiment is used under an environment where vibration easily occurs and receives vibration from the outside, not only the contact arm portion but also the elastic portion of the terminal elastically displace. That is, in the present embodiment, a lower elastically-displaceable portion is provided as compared to the typical case where only the contact arm portion is elastically displaceable. Thus, even if the electric connector receives vibration with a high frequency from the outside, the contact arm portion displaces together with the elastic portion. Accordingly, such elastic displacement easily follows the vibration. As a result, fine sliding contact between the contact arm portion and the circuit portion of the flat conductor and therefore generation of metal powder due to such sliding contact can be avoided. Thus, electric conduction between the contact portion and the circuit portion can be easily maintained.

(2) In the embodiment of (1), the elastic portion may have a bent portion bent at an intermediate position in a longitudinal direction of the elastic portion. Since the elastic portion is provided with the bent portion as described above, the entire length of the elastic portion can be extended without the elastic portion increased in length in the direction of bending of the bent portion. Thus, a great amount of elastic displacement of the elastic portion and therefore the terminal can be ensured.

(3) in the embodiments of (1) and (2), each terminal may include a pressing portion, and on an opposite side of the flat conductor from the contact arm portion in the upper-lower direction, the pressing portion directly or indirectly presses the flat conductor toward the contact arm portion. Since such a pressing portion is provided, the flat conductor is directly or indirectly sandwiched between the pressing portion and the contact arm portion. Thus, the pressure of contact between the contact arm portion and the circuit portion of the flat conductor increases. Even if the elastic portion and the contact arm portion are elastically displaced so as to follow vibration received by the electric connector from the outside, the flat conductor is maintained with sandwiched therebetween. Thus, a state of the contact arm portion and the circuit portion of the flat conductor contacting each other with a high contact pressure can be favorably maintained.

According to the present embodiment, the flat conductor electric connector can be provided, which is configured so that favorable contact between the terminal and the flat conductor can be easily maintained.

Hereinafter, an embodiment of the present disclosure will be described based on the attached drawings.

Figure 2:
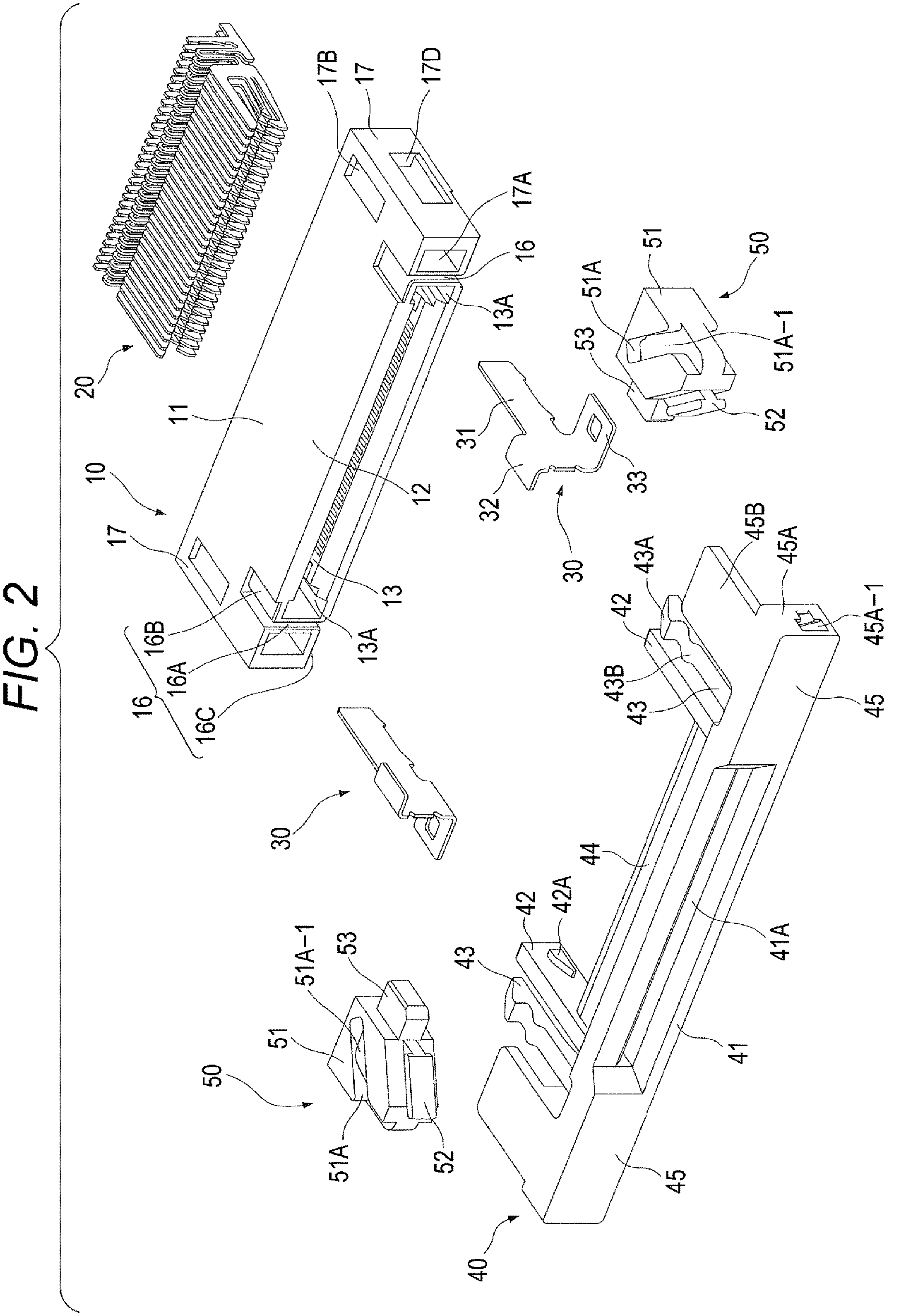
FIG. 2 is a perspective view showing disassembled members of the flat conductor electric connector of FIG. 1.
Figure 3:
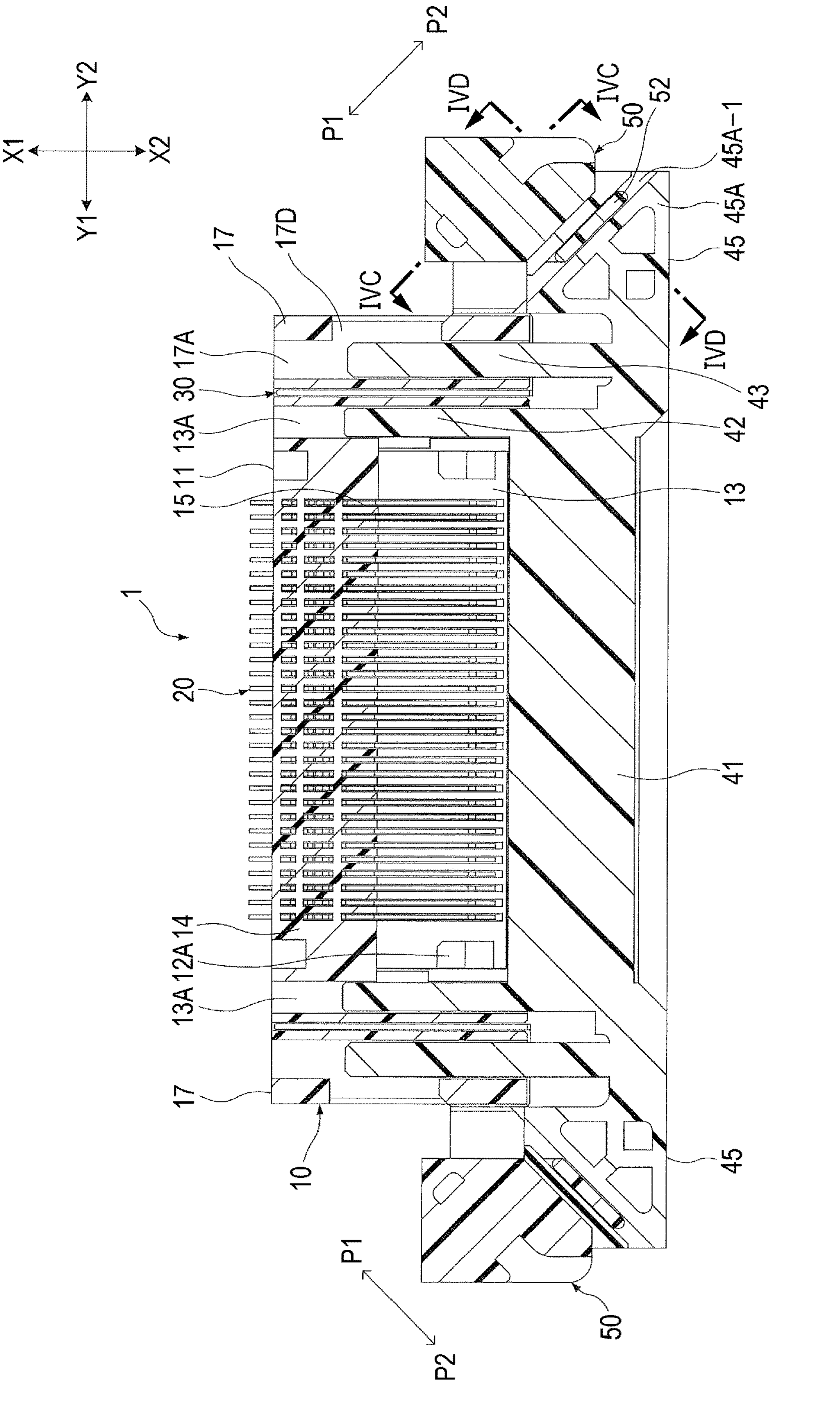
FIG. 3 is a cross-sectional view of the flat conductor electric connector of FIG. 1, and shows a section at the position of a guide groove portion in an upper-lower direction.
Figure 4A:
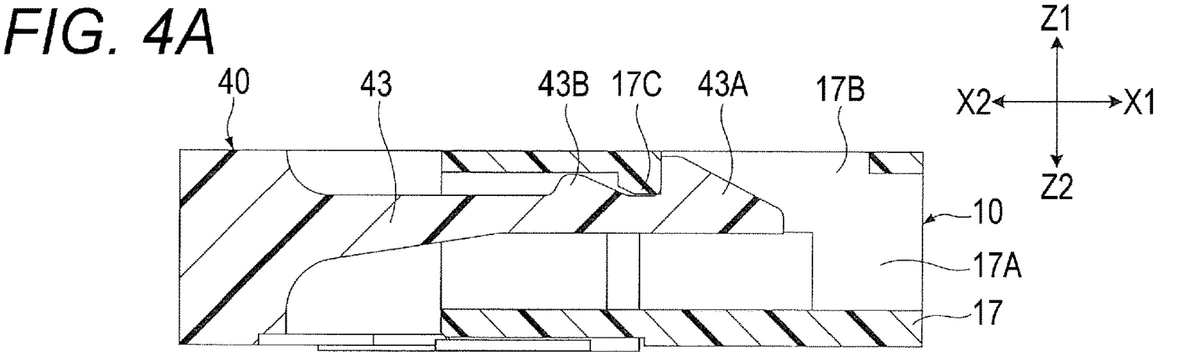
FIGS. 4A to 4D are longitudinal sectional views of the flat conductor electric connector of FIG. 1, FIG. 4A showing a section at the position of an outer arm portion in a connector width direction, FIG. 4B showing a section at the position of a terminal in the connector width direction, FIG. 4C showing a section at the position of a fitting detection member in a plane along a movement direction of the fitting detection member, and FIG. 4D showing a section at the position of the fitting detection member in a plane perpendicular to the movement direction of the fitting detection member.
Figure 4B:
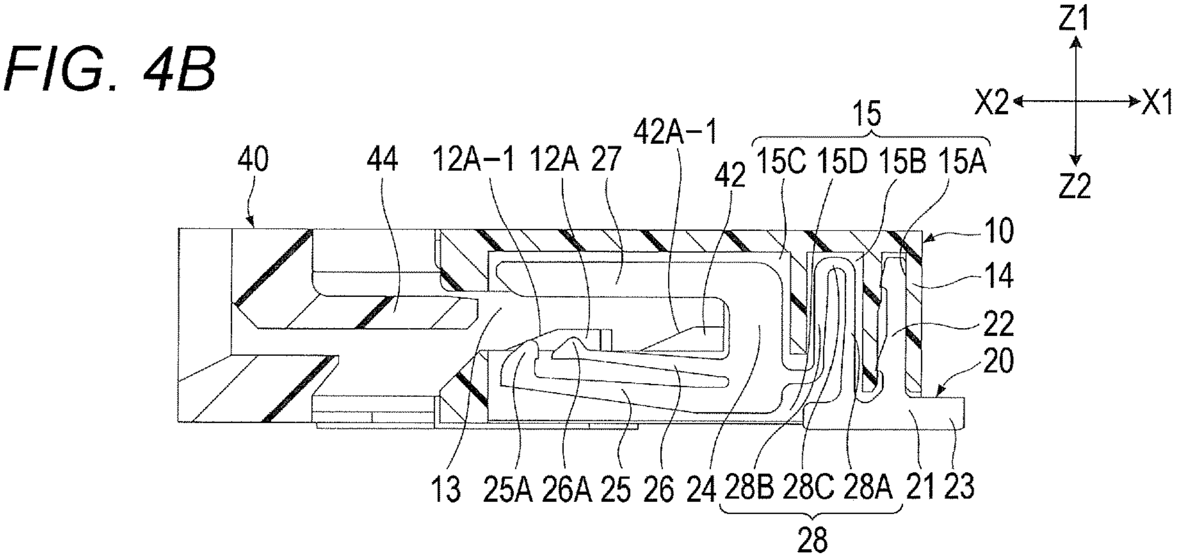
Figure 4C:
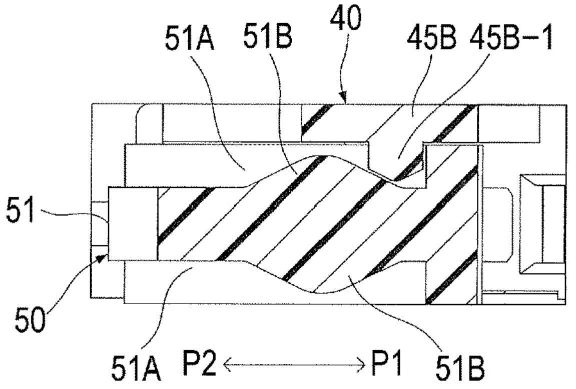
Figure 4D:
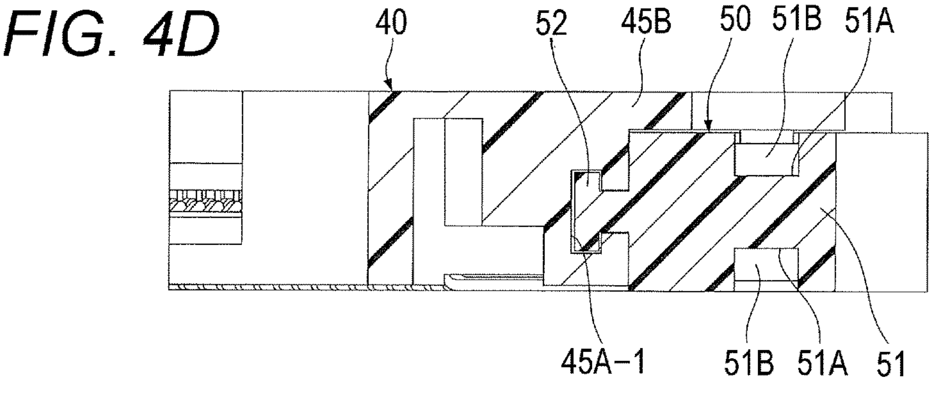

FIG. 1 is a perspective view showing, together with a flat conductor C, a flat conductor electric connector (hereinafter referred to as a "connector 1") according to the embodiment of the present disclosure. The flat conductor C is in a state before inserted into the connector 1. FIG. 2 is a perspective view showing disassembled members of the connector 1. FIG. 3 is a cross-sectional view of the connector 1 of FIG. 1. FIG. 3 shows a section at the position of a later-described guide groove portion 45A-1 in an upper-lower direction. FIGS. 4A to 4D are longitudinal sectional views of the connector 1. FIG. 4A shows a section at the position of a later-described outer arm portion 43 in a connector width direction. FIG. 4B shows a section at the position of a later-described terminal 20 in the connector width direction. FIG. 4C shows a section at the position of a later-described fitting detection member 50 in a plane along a movement direction of the fitting detection member 50. FIG. 4D shows a section at the position of the fitting detection member 50 in a plane perpendicular to the movement direction of the fitting detection member 50. Here, FIG. 4C is a sectional view at a position indicated by an IVC-IVC line in FIG. 3. FIG. 4D is a sectional view at a position indicated by an IVD-IVD line in FIG. 3.

The connector 1 shown in FIG. 1 is mounted on a mount surface of a circuit board (not shown). The flat conductor C (e.g., FPC) is connected to the connector 1 so as to be inserted into or removed from the connector 1 with a front-back direction (X-axis direction) parallel with the mount surface as an insertion-removal direction. When the flat conductor C is connected, the connector 1 causes the circuit board and the flat conductor C to be electrically conductive with each other. In the present embodiment, in the X-axis direction (front-back direction), an X1 direction is the front, and an X2 direction is the back. Moreover, a Y-axis direction perpendicular to the front-back direction (X-axis direction) in a plane (XY plane) parallel with the mount surface of the circuit board is defined as the connector width direction. A Z-axis direction perpendicular to the mount surface of the circuit board is the upper-lower direction (Z1 direction as the upper side, Z2 direction as the lower side).

The standard flat conductor C has a flexible band shape extending in the front-back direction (X-axis direction). Generally, the flat conductor C is configured such that a plurality of circuit portions (not shown) formed so as to extend in the front-back direction is aligned in the connector width direction (Y-axis direction, hereinafter sometimes merely referred to as a "width direction"). The circuit portions are embedded, except for front end side portions thereof, in an insulating layer of the flat conductor C. The circuit portions are exposed, only at the front end side portions thereof, through the lower surface of the flat conductor C. That is, pads are formed at the front end sides.

Front end side portions of the flat conductor C are formed, at both end portions thereof in the width direction, with cutout portions C1 which can receive locking protruding portions 12A of a housing 10 (described later) provided in the connector 1 from below. Further, the flat conductor C has ear portions C2 in front of the cutout portions C1. The back ends of the ear portions C2 are formed with locking target portions C2A which can be locked to the above-described locking protruding portions 12A from the front.

As shown in FIGS. 1 to 3, the connector 1 includes the housing 10 configured to receive the flat conductor C from the back and a slider 40 attached to the housing 10 so as to move in the front-back direction. In the example of the connector 1 shown in FIGS. 1 to 3, the plurality of terminals 20 aligned in the connector width direction (Y-axis direction) is held on the housing 10. Further, reinforcing fittings 30 arranged outside a terminal arrangement area of the plurality of terminals 20 are held on the housing 10. In addition, the fitting detection members 50 are attached to the slider 40 so as to move in directions inclined with respect to the front-back direction.

The housing 10 is made of an electric insulating material such as resin. As shown in FIG. 2, the housing 10 has a substantially rectangular parallelepiped outer shape extending with the connector width direction as a longitudinal direction. The housing 10 has, for example, a body portion 11 and side wall portions 17 provided on both outer sides of the body portion 11 in the connector width direction. A back portion of the body portion 11 may be provided with a fitting portion 12 into which part of the slider 40 is to be fitted. The fitting portion 12 is provided with a receiving portion 13 which can receive the part of the slider 40 and the front end side portions of the flat conductor C from the back. The receiving portion 13 is provided as a space extending in the connector width direction and opened to the back. Further, a front portion of the body portion 11 may be provided with a front wall portion 14 which holds the terminals 20 and extends in the connector width direction (see FIGS. 3 and 4B).

Receiving end portions 13A which are both end portions of the receiving portion 13 house inner arm portions 42 (described later) of the slider 40. In the present embodiment, groove portions extending in the front-back direction are formed as part of the receiving end portion 13A in the upper inner wall surface and lower inner wall surface of the receiving end portion 13A, i.e., the lower surface of the upper wall of the fitting portion 12 and the upper surface of the lower wall of the fitting portion 12. With these groove portions, the inner arm portion 42 of the slider 40 can be guided in the front-back direction in the receiving end portion 13A while movement of the inner arm portion 42 in the connector width direction is restricted.

As shown in FIG. 3, the lower inner wall surface of the receiving portion 13, i.e., the upper surface of the lower wall of the fitting portion 12, is provided with the upwardly-protruding locking protruding portions 12A between the terminal arrangement area and the receiving end portions 13A in the connector width direction (also see FIG. 4B). The locking protruding portion 12A has, for example, the front end surface forming a flat surface perpendicular to the front-back direction. With this configuration, the locking protruding portion 12A can be locked to the locking target portion C2A of the flat conductor C from the back (see FIG. 5B). As shown in FIG. 4B, the locking protruding portion 12A has, at the upper surface of a back portion thereof, an inclined surface 12A-1. Such an inclined surface is inclined upward as extending forward. The ear portion C2 of the flat conductor C inserted into the receiving portion 13 can be guided forward along the inclined surface 12A-1. On the other hand, the upper surface (hereinafter referred to as an "upper end surface") of a front portion of the locking protruding portion 12A is a flat surface perpendicular to the upper-lower direction.

As shown in FIG. 3, in the body portion 11, terminal housing portions 15 formed to house the terminals 20 are aligned in the connector width direction (also see FIG. 4B). In advance of detailed description of the terminal housing portion 15, a representative configuration of the terminal 20 will be described first. As shown in FIG. 2, the terminal 20 is formed of a metal plate member punched in the plate thickness direction thereof. As shown in FIG. 4B, the terminal 20 has an attachment portion (later-described lower leg portion 21 and holding target portion 22) and a connection portion 23 on one end side, a base arm portion 24, a lower contact arm portion 25, an upper contact arm portion

26, and a pressing arm portion 27 on the other end side, and an elastic portion 28 provided between the attachment portion and the base arm portion 24. Hereinafter, in a case where the lower contact arm portion 25 and the upper contact arm portion 26 do not need to be distinguished from each other, these arm portions will be collectively referred to as "contact arm portions 25, 26" for the sake of convenience in description.

As shown in FIG. 4B, the attachment portion has the lower leg portion 21 extending in the front-back direction along the lower surface of the front wall portion 14 of the housing 10 and the holding target portion 22 extending upward from a front portion of the lower leg portion 21. A side edge portion (edge portion extending in the upper-lower direction) of the holding target portion 22 is formed with a plurality of protrusions which is for press-fitting and holding the holding target portion 22 in the front wall portion 14. The connection portion 23 extends forward from the front end of the lower leg portion 21. Thus, an end portion of the connection portion 23 is positioned outside the housing 10, and at the lower edge of the end portion, the terminal 20 is soldered to a corresponding one of the circuit portions of the circuit board.

The base arm portion 24 extends in the upper-lower direction along the back surface of the front wall portion 14. The contact arm portions 25, 26 extend backward from a lower portion of the base arm portion 24 along the lower wall of the fitting portion 12 of the housing 10. The contact arm portions 25, 26 are elastically displaceable in the upper-lower direction. The back end of the lower contact arm portion 25 is formed with a back contact portion 25A which protrudes upward and is positioned in the receiving portion 13 of the housing 10. The upper contact arm portion 26 is provided above the lower contact arm portion 25. The upper contact arm portion 26 is shorter than the lower contact arm portion 25. The back end of the upper contact arm portion 26 is formed with a front contact portion 26A which protrudes upward on the front side with respect to the back contact portion 25A and is positioned in the receiving portion 13 of the housing 10. Hereinafter, in a case where the back contact portion 25A and the front contact portion 26A do not need to be distinguished from each other, these contact portions will be collectively referred to as "contact portions 25A, 26A" for the sake of convenience in description. The contact arm portions 25, 26 can contact, at the contact portions 25A, 26A, the circuit portion of the flat conductor C from below with contact pressure while elastically displacing downward.

The pressing arm portion 27 extends backward along the upper wall of the fitting portion 12 from an upper portion of the base arm portion 24 to the substantially same position as that of the back end of the lower contact arm portion 25. The pressing arm portion 27 can indirectly press the flat conductor C from above toward the contact portions 25A, 26A through a later-described upper abutting portion 44 of the slider 40 (see FIGS. 8B and 10B). In the present embodiment, the thickness of the pressing arm portion 27 in the upper-lower direction is greater than those of the contact arm portions 25, 26.

The elastic portion 28 has a substantially inverted U-shape opened downward, and couples the lower leg portion 21 and the base arm portion 24 to each other. The elastic portion 28 has a front leg portion 28A extending in the upper-lower direction on the front side, a back leg portion 28B extending in the upper-lower direction on the back side, and a bent portion 28C bent downward and coupling upper end portions of the front leg portion 28A and the back leg portion 28B to each other. The front leg portion 28A is coupled, at the lower end thereof, to a back portion of the lower leg portion 21. A lower end portion of the back leg portion 28B is bent backward, and is coupled to the lower portion of the base arm portion 24. The elastic portion 28 is elastically displaceable in any of the front-back direction, the connector width direction, and the upper-lower direction. In the present embodiment, the elastic portion 28 is provided with the bent portion 28C. Thus, a great entire length of the elastic portion 28 can be ensured without the need for extending the elastic portion 28 in a bending direction of the bent portion 28C, i.e., the upper-lower direction. With this configuration, a great elastic displacement amount of the elastic portion 28 and therefore the terminal 20 can be ensured.

Return to description of the terminal housing portion 15 of the housing 10. The terminal housing portion 15 is formed as a slit-shaped groove portion expanding perpendicularly to the connector width direction (Y-axis direction). As shown in FIG. 4B, the terminal housing portion 15 has a front housing portion 15A, an intermediate housing portion 15B, a lower housing portion 15C, and a back housing portion 15D formed in the front wall portion 14 and the fitting portion 12.

The front housing portion 15A extends in the upper-lower direction in a front portion of the front wall portion 14, and forms a terminal holding portion. The terminal 20 is press-fitted and held with the terminal holding portion housing the holding target portion 22 of the terminal 20. The intermediate housing portion 15B extends in the upper-lower direction in a back portion of the front wall portion 14, and houses the elastic portion 28. A clearance expanding in the front-back direction, the connector width direction, and the upper-lower direction is formed between the elastic portion 28 housed in the intermediate housing portion 15B and the inner wall surface of the intermediate housing portion 15B (see FIG. 4B). With this configuration, the elastic portion 28 is elastically displaceable in these three directions. Moreover, a lower portion of the intermediate housing portion 15B is opened to the back, and communicates with the back housing portion 15D. With this configuration, a lower end portion of the back leg portion 28B of the elastic portion 28 is housed in the back housing portion 15D.

The lower housing portion 15C is formed, in a lower portion of the front wall portion 14, so as to penetrate the front wall portion 14 in the front-back direction. The lower housing portion 15C houses the lower leg portion 21 of the terminal 20. Moreover, the lower housing portion 15C is opened in the upper-lower direction, and communicates with the front housing portion 15A and the intermediate housing portion 15B.

The back housing portion 15D extends along the lower and upper walls of the fitting portion 12 and the front wall portion 14, and has a substantially backwards C-shape opened to the back. The back housing portion 15D houses the contact arm portions 25, 26 in a lower groove portion extending in the front-back direction along the above-described lower wall. Moreover, the back housing portion 15D houses the pressing arm portion 27 extending in the front-back direction in an upper groove portion along the above-described upper wall. Further, the back housing portion 15D houses the base arm portion 24 extending in the upper-lower direction in a front groove portion along the front wall portion 14. As seen from FIG. 4B, the lower groove portion is opened upward and downward. On the other hand, the upper groove portion is opened downward, but is closed at the upper end.

The terminal 20 is attached, from below, to the terminal housing portion 15 having such a shape, and is housed therein. Specifically, the holding target portion 22 of the terminal 20 is press-fitted in the front housing portion 15A from below. In this manner, the terminal 20 is housed in the terminal housing portion 15, and is held on the housing 10. When the terminal 20 is attached to the housing 10, the contact portions 25A, 26A of the terminal 20 protrude upward from the lower groove portion of the back housing portion 15D and are positioned in the receiving portion 13, as shown in FIG. 4B. Then, a lower end portion of the pressing arm portion 27 protrudes downward from the upper groove portion of the back housing portion 15D, and is positioned in the receiving portion 13.

As shown in FIG. 2, both end portions of the housing 10 in the connector width direction are formed with fitting housing portions 16 which house and hold the reinforcing fittings 30. The fitting housing portion 16 includes a slit-shaped vertical groove portion 16A, an upper horizontal recessed portion 16B, and a lower horizontal recessed portion 16C. The vertical groove portion 16A extends forward from the back end of the housing 10 between the fitting portion 12 and the side wall portion 17 in the connector width direction, and expands in a direction perpendicular to the connector width direction. The upper horizontal recessed portion 16B is recessed from the upper surface of the end portion of the housing 10 in the connector width direction in a back portion of the fitting portion 12, and communicates with the upper end of the vertical groove portion 16A. The lower horizontal recessed portion 16C is recessed from the lower surface of a back portion of the side wall portion 17, and communicates with the lower end of the vertical groove portion 16A.

As shown in FIGS. 2 and 4A, the side wall portion 17 is formed with an outer hole portion 17A. The outer hole portion 17A is formed so as to penetrate the side wall portion 17 in the front-back direction and receive the outer arm portion 43 of the slider 40 (described later) from the back. Moreover, the upper wall of the side wall portion 17 is formed with a quadrangular upper hole portion 17B. The upper hole portion 17B penetrates, at a position closer to the front end side, the upper wall in the upper-lower direction, and communicates with the outer hole portion 17A. As shown in FIG. 4A, part of a back edge portion of the upper hole portion 17B protrudes downward, and is positioned in the outer hole portion 17A. The back edge portion of the upper hole portion 17B forms a slider locking portion 17C lockable to the outer arm portion 43 of the slider 40 from the back. Of the side wall portion 17, the outer wall positioned outside in the connector width direction is formed with a quadrangular side hole portion 17D. The side hole portion 17D penetrates the outer wall at an intermediate position in the front-back direction, and communicates with the outer hole portion 17A.

As shown in FIG. 2, the reinforcing fitting 30 is formed of a metal plate member bent in the plate thickness direction thereof. The reinforcing fitting 30 includes a holding target plate portion 31, an upper plate portion 32, and a fixing portion 33. The holding target plate portion 31 extends in the front-back direction such that the connector width direction and the plate thickness direction are coincident with each other. The upper plate portion 32 is bent at right angle at the upper edge of a back portion of the holding target plate portion 31, and extends inward in the connector width direction. The fixing portion 33 is bent at right angle at the lower edge of the back portion of the holding target plate portion 31, and extends outward in the connector width direction. The lower edge of the holding target plate portion 31 is provided with a plurality of protrusions. These protrusions bite into the inner wall surface of the vertical groove portion 16A of the housing 10. In this manner, the protrusions are housed in the vertical groove portion 16A. The upper plate portion 32 is housed in the upper horizontal recessed portion 16B of the housing 10, and faces the upper surface of the fitting portion 12 of the housing 10. The fixing portion 33 is housed in the lower horizontal recessed portion 16C of the housing 10, and is fixed to a corresponding portion of the circuit board by soldering.

In the present embodiment, the upper plate portion 32 faces the upper surface of the fitting portion 12 as described above. Thus, if upward external force acts on the flat conductor C connected to the connector 1 and is transmitted to the upper wall of the fitting portion 12, the upper plate portion 32 contacts the fitting portion 12 from above. Accordingly, downward reactive force against the above-described external force acts on the fitting portion 12. That is, the upper plate portion 32 is provided as described above so that upward movement of the fitting portion 12 can be restricted. Thus, detachment of the connector 1 from the circuit board can be reduced.

In the present embodiment, one reinforcing fitting 30 is provided for each outer side of the terminal arrangement area. That is, one reinforcing fitting 30 and the other reinforcing fitting 30 are provided as separate members. Thus, if the dimension of the housing in the connector width direction is changed because of an increase/decrease in the number of terminals provided in the connector due to a design change, the reinforcing fitting 30 having the same shape as that before the design change can be used without change. As a result, an increase in a manufacturing cost due to the design change can be suppressed.

Figure 7A:
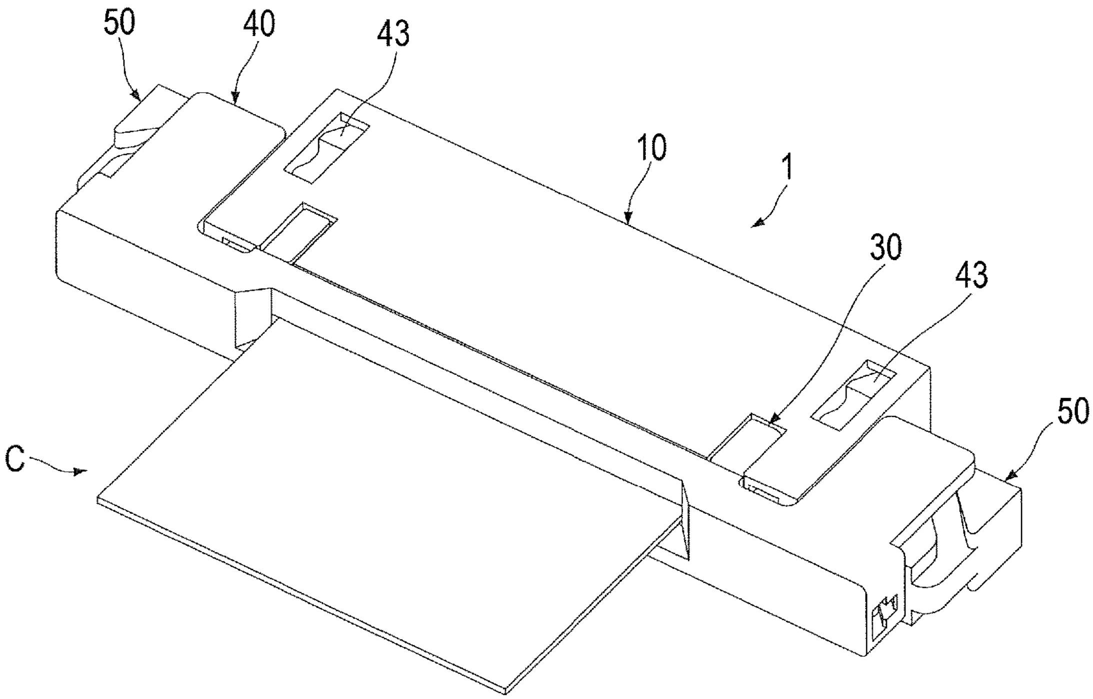
FIGS. 7A and 7B are views showing, together with the flat conductor, the flat conductor electric connector, FIG. 7A being a perspective view immediately after a slider has been moved to an advance position after insertion of the flat conductor and FIG. 7B being a cross-sectional view of the section of FIG. 7A at the position of the guide groove portion in the upper-lower direction.

The slider 40 is attached to the housing 10 so as to move in the front-back direction between a retreat position at which removal of the flat conductor C is allowed and an advance position at which a state of removal of the flat conductor C being restricted is maintained. When the slider 40 is at the retreat position, removal of the flat conductor C is allowed (see FIGS. 1 and 3). On the other hand, when the slider 40 is the advance position, removal of the flat conductor C is restricted (e.g., see FIGS. 7A and 7B). The slider 40 is fitted in the housing 10 at the advance position. The slider 40 is made of an electric insulating material such as resin. As shown in FIG. 2, the slider 40 includes a base portion 41 extending in the connector width direction, the inner arm portions 42 and the outer arm portions 43 extending forward from both end portions of the base portion 41 in the connector width direction, the upper abutting portion 44 (first abutting portion) extending forward from the base portion 41 between the two inner arm portions 42, and side portions 45 each coupled to the end portions of the base portion 41.

The base portion 41 is provided so as to expand over the substantially same area as that of the housing 10 as viewed in the front-back direction. An area of the base portion 41 corresponding to the receiving portion 13 of the housing 10 is formed with an insertion hole portion 41A which penetrates the base portion 41 in the front-back direction. The insertion hole portion 41A has a slit shape extending in the connector width direction in a center area of the base portion 41. With this configuration, insertion of the flat conductor C into the insertion hole portion 41A is allowed.

Figure 11A:
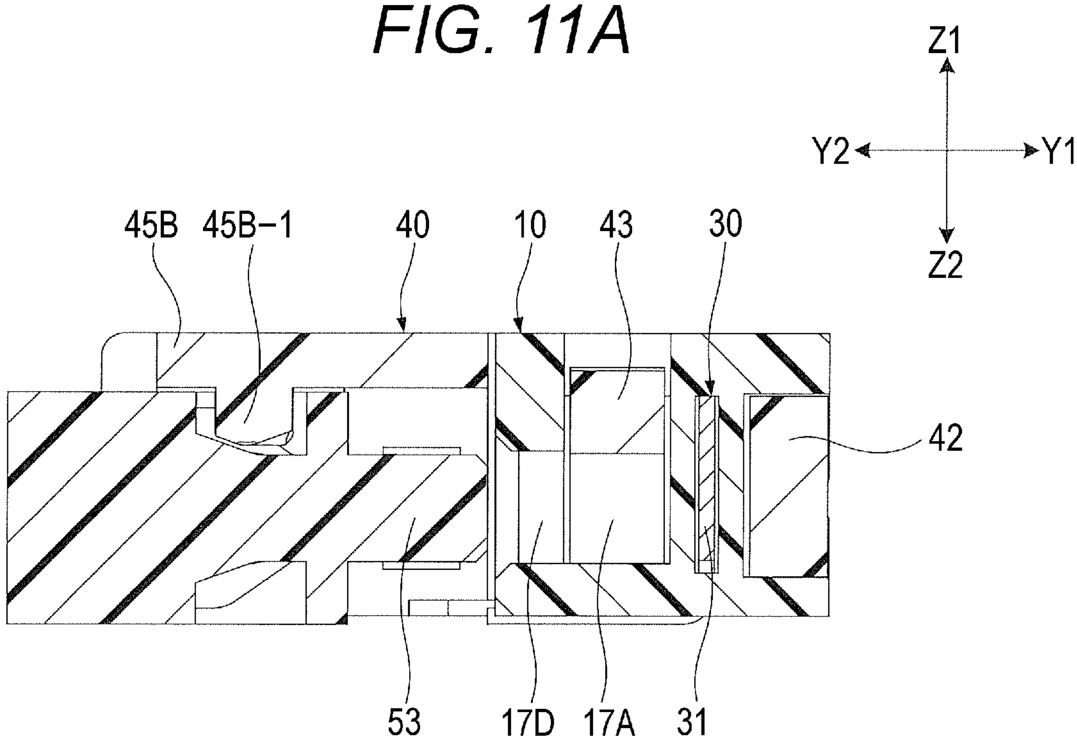
FIGS. 11A and 11B are longitudinal sectional views of an end portion of the flat conductor electric connector in the connector width direction in a plane perpendicular to the front-back direction, FIG. 11A showing a state of the fitting detection member being at a standby position and FIG. 11B showing a state of the fitting detection member being at a detection position.

The plate-shaped inner arm portion 42 is arranged such that the connector width direction and the plate thickness direction of the inner arm portion 42 are coincident with each other. The sectional shape of the inner arm portion 42 perpendicular to the front-back direction has a rectangular shape of which the longitudinal direction is the upper-lower direction (see FIGS. 11A and 11B). A lower abutting portion 42A (second abutting portion) protruding in the connector width direction from the inner surface of the inner arm portion 42 is provided on a lower front portion of the inner arm portion 42. The lower abutting portion 42A is provided outside the locking protruding portion 12A of the housing 10 in the connector width direction. As shown in FIG. 4B, the lower abutting portion 42A has a trapezoidal shape as viewed in the connector width direction. Of the lower abutting portion 42A, the upper surface of a back portion forms an inclined surface 42A-1 inclined downward such that the dimension of the lower abutting portion 42A in the upper-lower direction decreases, i.e., inclined downward as extending backward. The upper surface (hereinafter referred to as an "upper end surface") of a front portion of the lower abutting portion 42A is a flat surface perpendicular to the upper-lower direction. As shown in FIG. 4B, the lower abutting portion 42A is provided at the substantially same position as that of the locking protruding portion 12A of the housing 10 in the upper-lower direction. However, the upper end surface of the lower abutting portion 42A is positioned higher than the upper end surface of the locking protruding portion 12A. Note that the upper end surface of the lower abutting portion 42A may be at the same position as that of the upper end surface of the locking protruding portion 12A in the upper-lower direction.

As shown in FIG. 2, the outer arm portion 43 is provided adjacent to the inner arm portion 42 on the outer side of the inner arm portion 42 in the connector width direction. The outer arm portion 43 forms an elastic arm portion elastically deformable in the upper-lower direction. The outer arm portion 43 has the substantially same length as that of the inner arm portion 42. A front portion of the outer arm portion 43 is provided with a front claw portion 43A and a back claw portion 43B which protrude upward. The front claw portion 43A has a substantially triangular shape protruding upward at a front end portion of the outer arm portion 43. The upper surface of the front claw portion 43A forms an inclined surface inclined upward as extending backward from the front end of the front claw portion 43A. The back surface of the front claw portion 43A forms a flat surface perpendicular to the front-back direction. As shown in FIG. 4A, when the slider 40 is the retreat position, the front claw portion 43A is locked to the slider locking portion 17C of the housing 10 from the front. With this configuration, backward movement of the slider 40 is restricted.

The back claw portion 43B is positioned on the back side with respect to the front claw portion 43A. The back claw portion 43B has a substantially triangular shape shorter in height than the front claw portion 43A, and protrudes upward. The upper surface of the back claw portion 43B is an inclined surface inclined at the substantially same angle as that of the upper surface of the front claw portion 43A. The back surface of the back claw portion 43B is an inclined surface slightly inclined forward with respect to the upper-lower direction, specifically an inclined surface inclined forward as extending upward. When the slider 40 is at the advance position, the back surface of the back claw portion 43B can be locked to the slider locking portion 17C of the housing 10 from the front. With this configuration, backward movement of the slider 40 is restricted (see FIGS. 8A and 10A). Since the back claw portion 43B has the inclined back surface as described above, a force of the back claw portion 43B being locked to the slider locking portion 17C is smaller than that of the front claw portion 43A.

The upper abutting portion 44 (first abutting portion) is positioned higher than the insertion hole portion 41A of the base portion 41. The first abutting portion extends in the connector width direction, and couples the inner surfaces of the two inner arm portions to each other. When the slider 40 is at the advance position, the upper abutting portion 44 enters, from the back, a clearance between the contact portions 25A, 26A and the pressing arm portion 27 of the terminal 20 within the terminal arrangement area expanding in the connector width direction (see FIG. 8B). At this time, the upper abutting portion 44 receives pressing force from the pressing arm portions 27 from above. In addition, the upper abutting portion 44 presses the upper surface of the flat conductor C downward to increase the pressure of contact of the flat conductor C inserted into and connected to the connector with the contact portions 25A, 26A and the pressing arm portion 27. When the slider 40 is at the advance position, the upper surface of the flat conductor C faces the upper abutting portion 44 at positions immediately above the locking protruding portions 12A of the housing 10 at both ends of the first abutting portion in the connector width direction. In this state, the upper abutting portion 44 abuts the upper surface of the flat conductor C to restrict movement of the flat conductor C in the direction (upward direction) of protrusion of the locking protruding portion 12A.

The side portion 45 includes a guide portion 45A coupled to an end portion of the base portion 41 and an extending portion 45B extending forward from an upper portion of the guide portion 45A. The guide portion 45A is formed with the guide groove portion 45A-1 which is for guiding the fitting detection member 50 between a standby position (described later) and a detection position (described later). As shown in FIG. 3, the guide groove portion 45A-1 extends in a direction which is parallel with the surface (XY plane) of the flat conductor and is inclined with respect to the front-back direction (X-axis direction), specifically a direction (P-axis direction in FIG. 3) inclined inward in the connector width direction as extending forward. Moreover, the guide groove portion 45A-1 is formed so as to penetrate the guide portion 45A. Further, as shown in FIG. 4D, the sectional shape of the guide groove portion 45A-1 in the longitudinal direction thereof is a horizontally-oriented T-shape.

As shown in FIG. 4C, the extending portion 45B is provided with a positioning protruding portion 45B-1 which protrudes from the lower surface of the extending portion 45B. The positioning protruding portion 45B-1 can be locked to a bulging portion 51B (described later) of the fitting detection member 50 in the movement direction (P-axis direction) of the fitting detection member 50. With this configuration, the extending portion 45B maintains the fitting detection member 50 at the standby position (see FIG. 4C) or the detection position (see FIG. 10C). As shown in FIG. 4C, the lower end surface of the positioning protruding portion 45B-1 has two inclined surfaces. Thus, the positioning protruding portion 45B-1 has a shape tapered downward.

The fitting detection member 50 is attached to the slider 40 so as to move between the detection position at which a state of the slider 40 being at the advance position is detectable and the standby position at which operation toward the standby position stands by. The fitting detection member 50 is made of an electric insulating material such as resin. One fitting detection member 50 is attached to each side portion 45 of the slider 40. As shown in FIG. 2, the two fitting detection members 50 having the same shape are aligned in the connector width direction at postures rotationally symmetrical about the front-back direction. That is, in the present embodiment, each fitting detection member 50 has a shape symmetrical in the upper-lower direction. Thus, one of the fitting detection members 50 aligned is inverted from the other fitting detection member 50 about the front-back direction. Since the fitting detection member 50 is formed with the shape symmetrical in the upper-lower direction as described above, the fitting detection members 50 of one type can be provided at the vertically-inverted postures on both sides in the connector width direction. Thus, two types of fitting detection members 50 having different shapes do not need to be prepared, and therefore, the manufacturing cost can be reduced.

The fitting detection member 50 includes an operation portion 51 configured to receive operation for movement from a worker and a guide target protruding portion 52 and a restriction portion 53 protruding from side surfaces of the operation portion 51. The operation portion 51 has a rectangular columnar shape having a substantially trapezoidal shape as viewed in the upper-lower direction. A positioning groove portion 51A for positioning the fitting detection member 50 at any of the standby position and the detection position is formed in each of the upper and lower surfaces of the operation portion 51. The positioning groove portion 51A is recessed from each of the upper and lower surfaces of the operation portion 51. Moreover, the positioning groove portion 51A is formed so as to extend in the movement direction of the fitting detection member 50, i.e., extend in the direction (P-axis direction in FIG. 3) which is parallel with the surface (XY plane) of the flat conductor C inserted into and connected to the connector and is inclined inward in the connector width direction as extending forward. As shown in FIGS. 2 and 4C, the positioning groove portion 51A is closed on the front end side (P1 side in FIG. 4C) in the movement direction. On the other hand, the positioning groove portion 51A is opened on the back end side (P2 side in FIG. 4C) in the movement direction.

As shown in FIG. 4C, the bulging portion 51B bulging in a mountain shape from the bottom surface of the positioning groove portion 51A is formed in the positioning groove portion 51A. As shown in FIG. 4C, the bulging portion 51B is locked to the positioning protruding portion 45B-1 of the extending portion 45B in the movement direction (P-axis direction). The position of the fitting detection member 50 is determined by on which side (P1 side or P2 side) in the movement direction the bulging portion 51B is positioned with respect to the positioning protruding portion 45B-1. Specifically, when the bulging portion 51B is positioned on the back side (P2 side) in the movement direction with respect to the positioning protruding portion 45B-1, the fitting detection member 50 is maintained at the standby position (see FIG. 4C). On the other hand, when the bulging portion 51B is positioned on the front side (P1 side) in the movement direction with respect to the positioning protruding portion 45B-1, the fitting detection member 50 is maintained at the detection position (see FIG. 10C).

In the present embodiment, in a course of the fitting detection member 50 moving between the standby position and the detection position, when the positioning protruding portion 45B-1 and the bulging portion 51B abut each other, the extending portion 45B is elastically displaced in the plate thickness direction thereof (upper-lower direction). Accordingly, the positioning protruding portion 45B-1 slightly displaces upward. As a result, the positioning protruding portion 45B-1 can move over the bulging portion 51B. In this manner, further movement of the fitting detection member 50 in the movement direction is allowed.

As shown in FIGS. 2 and 3, the operation portion 51 has, at a back portion thereof, the side surface extending in the movement direction (P-axis direction). The guide target protruding portion 52 is provided so as to protrude from such a side surface and extend in the movement direction. As shown in FIG. 4D, the guide target protruding portion 52 has a horizontally-oriented T-shape in a section perpendicular to the movement direction. The guide target protruding portion 52 is housed in the guide groove portion 45A-1 of the slider 40. The guide target protruding portion 52 is guided by the guide groove portion 45A-1 so that the fitting detection member 50 can smoothly move in the movement direction.

The restriction portion 53 is provided so as to protrude from the inner surface (flat surface perpendicular to the connector width direction) of a front portion of the operation portion 51 in the connector width direction. The restriction portion 53 has a substantially quadrangular columnar shape, and protrudes inward in the connector width direction from the side surface. The restriction portion 53 is positioned so as to abut, immediately below the outer arm portion 43, the outer arm portion 43 when the fitting detection member 50 is at the detection position. With this configuration, downward elastic displacement of the outer arm portion 43 is restricted (see FIGS. 10A and 11B). The restriction portion 53 is not positioned immediately below the outer arm portion 43 when the fitting detection member 50 is not at the detection position. Thus, downward elastic displacement of the outer arm portion 43 is allowed (see FIG. 11A).

In the present embodiment, the fitting detection member 50 is provide so as to move in the direction parallel with the surface (XY plane) of the flat conductor C inserted into and connected to the connector. Thus, upon movement of the fitting detection member 50, the fitting detection member 50 does not protrude in the upper-lower direction from the housing 10. Consequently, an increase in the size of the connector 1 in the upper-lower direction can be easily avoided. Moreover, the fitting detection member 50 is provided so as to move in the direction inclined with respect to the front-back direction. Thus, as compared to a case where the fitting detection member 50 is provided so as to move only in the connector width direction, the amount of movement of the fitting detection member in the connector width direction can be decreased. Consequently, upon movement of the fitting detection member 50, the fitting detection member 50 does not greatly protrude to the outside of the housing 10 in the connector width direction. As a result, an increase in the size of the connector 1 in the connector width direction can be easily avoided.

A method for assembling the connector 1 will be described. First, the terminals 20 are attached to the housing 10 from below. In addition, the reinforcing fittings 30 are attached to the housing 10 from the back. Specifically, the holding target portion 22 of the terminal 20 is press-fitted in the front housing portion 15A of the housing 10 from below. In this manner, the terminals 20 are each housed in the terminal housing portions 15. Moreover, the holding target plate portion 31 of the reinforcing fitting 30 is press-fitted in the vertical groove portion 16A of the housing 10 from the back. In this manner, the reinforcing fittings 30 are each housed in the fitting housing portions 16. Note that regarding the order of attachment of the terminals 20 and the reinforcing fittings 30, either the terminals 20 or the reinforcing fittings 30 may be attached first. Alternatively, the terminals 20 and the reinforcing fittings 30 may be simultaneously attached.

The fitting detection members 50 are each attached to the side portions 45 of the slider 40 from the front side (P1 side in FIG. 3) in the movement direction of the fitting detection member 50. Specifically, the guide target protruding portion 52 of the fitting detection member 50 is inserted into the guide groove portion 45A-1 of the slider 40 from the front side in the movement direction. At the same time, the positioning protruding portion 45B-1 of the slider 40 enters, from the back side (P2 side in FIG. 3) in the movement direction of the fitting detection member 50, the positioning groove portion 51A formed in the upper surface of the fitting detection member 50. At this time, the positioning protruding portion 45B-1 moves over the bulging portion 51B. Accordingly, the fitting detection member 50 is pushed in until reaching the standby position.

Note that in the present embodiment, the front end side of the positioning groove portion 51A in the movement direction is closed. Thus, such a front end portion can abut, at the standby position, the positioning protruding portion 45B-1 from the front in the movement direction. Thus, the fitting detection member 50 pushed in from the front side in the movement direction is not removed backward from the side portion 45 in the movement direction. The fitting detection member 50 may be attached before or after attachment of the terminals 20 and the reinforcing fittings 30 to the housing 10. Alternatively, these members may be simultaneously attached.

Next, the slider 40 is attached to the housing 10 from the back. Specifically, the inner arm portions 42 of the slider 40 are each inserted into the receiving end portions 13A of the housing 10 from the back. In addition, the outer arm portions 43 of the slider 40 are each inserted into the outer hole portions 17A of the housing 10 from the back. Such a process of attaching the slider 40 is performed until the slider 40 is arranged at the retreat position, i.e., until the front claw portions 43A of the outer arm portions 43 are each positioned in front of the slider locking portions 17C of the housing 10 (see FIG. 4A).

In a course of inserting the outer arm portion 43, the inclined surface of the front claw portion 43A of the outer arm portion 43 abuts the slider locking portion 17C of the housing 10 from the back. Accordingly, the outer arm portion 43 elastically displaces downward, and therefore, further forward insertion of the outer arm portion 43 is allowed. Then, the front claw portion 43A passes the position of the slider locking portion 17C, and is positioned in front of the slider locking portion 17C. As a result, the slider 40 is arranged at the retreat position. At this retreat position, the front claw portion 43A can be locked to the slider locking portion 17C from the front. With this configuration, removal of the slider 40 from the housing 10 is reduced. As shown in FIG. 1, the side portions 45 of the slider 40 are positioned along the side surfaces of the housing 10 on both outer sides of the housing 10 in the connector width direction. As described above, the slider 40 is attached to the housing 10. In this manner, the connector 1 is completed.

Figure 6A:
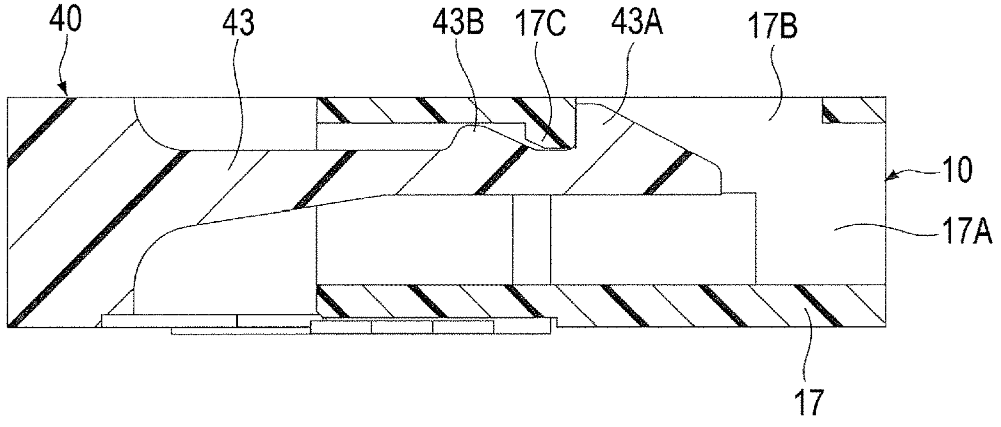
FIGS. 6A to 6C are longitudinal sectional views of the flat conductor electric connector of FIG. 5A, FIG. 6A showing a section at the position of the outer arm portion in the connector width direction, FIG. 6B showing a section at the position of the terminal in the connector width direction, and FIG. 6C showing a section at the position of the fitting detection member in a plane along the movement direction of the fitting detection member.
Figure 6B:
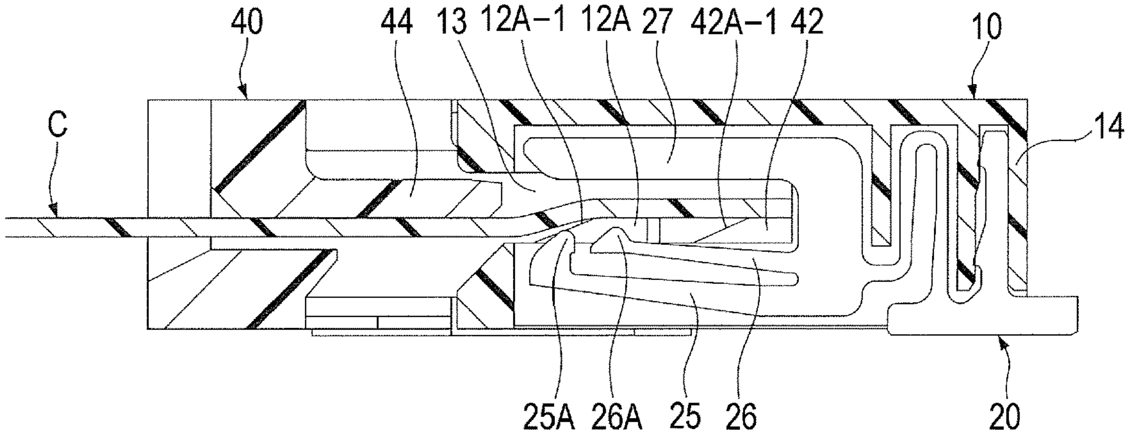
Figure 6C:
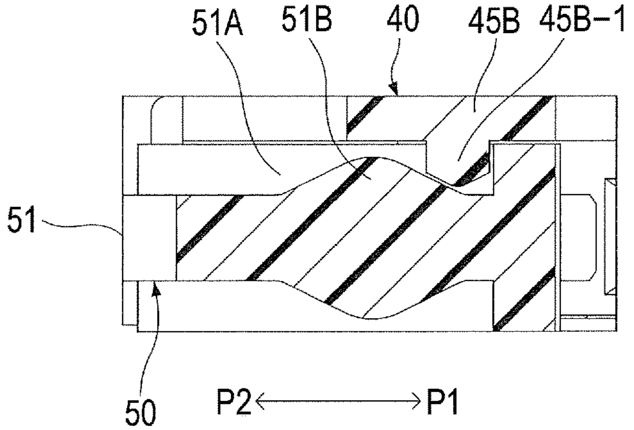

Next, an operation of inserting the flat conductor C into the connector 1 and removing the flat conductor C from the connector 1 will be described. First, as shown in FIG. 1, the flat conductor C is positioned in back of the connector 1 with the front end side portions of the flat conductor C extending in the front-back direction. Next, the front end side portions of the flat conductor C are each inserted forward into the insertion hole portions 41A of the slider 40. Further, the flat conductor C is inserted forward into the receiving portion 13 of the housing 10. In a course of inserting the flat conductor C into the receiving portion 13, the flat conductor C enters the clearance between the contact arm portions 25, 26 and the pressing arm portion 27 of each terminal 20, as shown in FIG. 6B. Such insertion of the flat conductor C is completed when the front end of the flat conductor C abuts the back surface of the front wall portion 14.

Figure 5A:
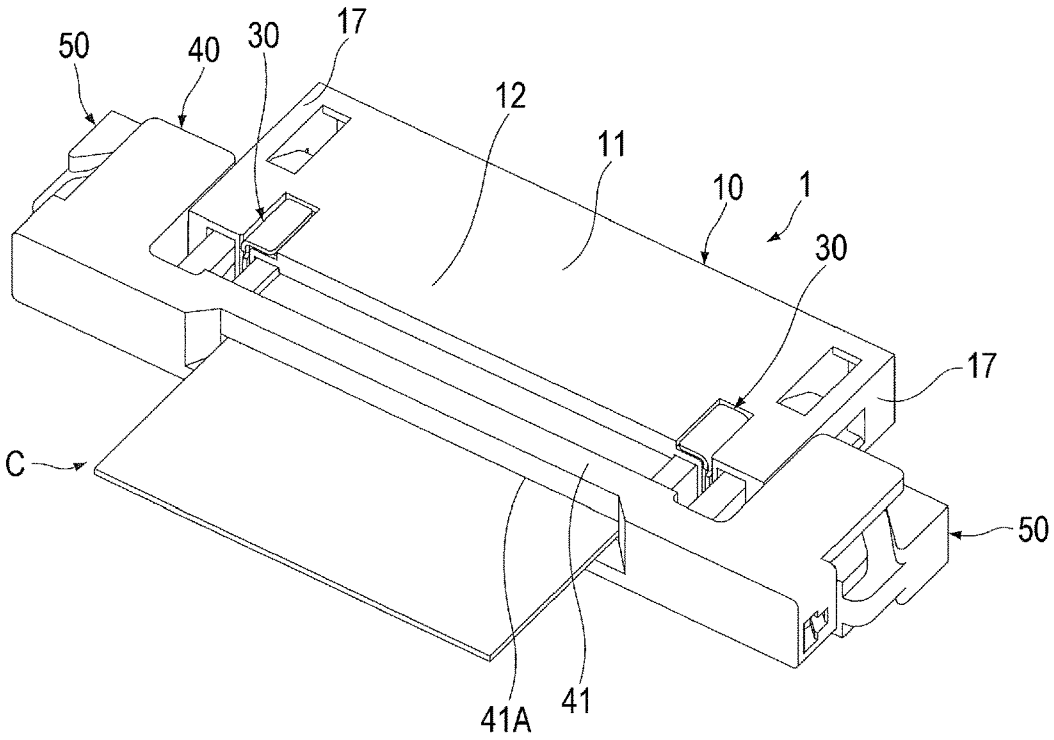
FIGS. 5A and 5B are views showing, together with the flat conductor, the flat conductor electric connector, FIG. 5A being a perspective view immediately after insertion of the flat conductor and FIG. 5B being a cross-sectional view of a section at the position of the guide groove portion in the upper-lower direction.
Figure 5B:
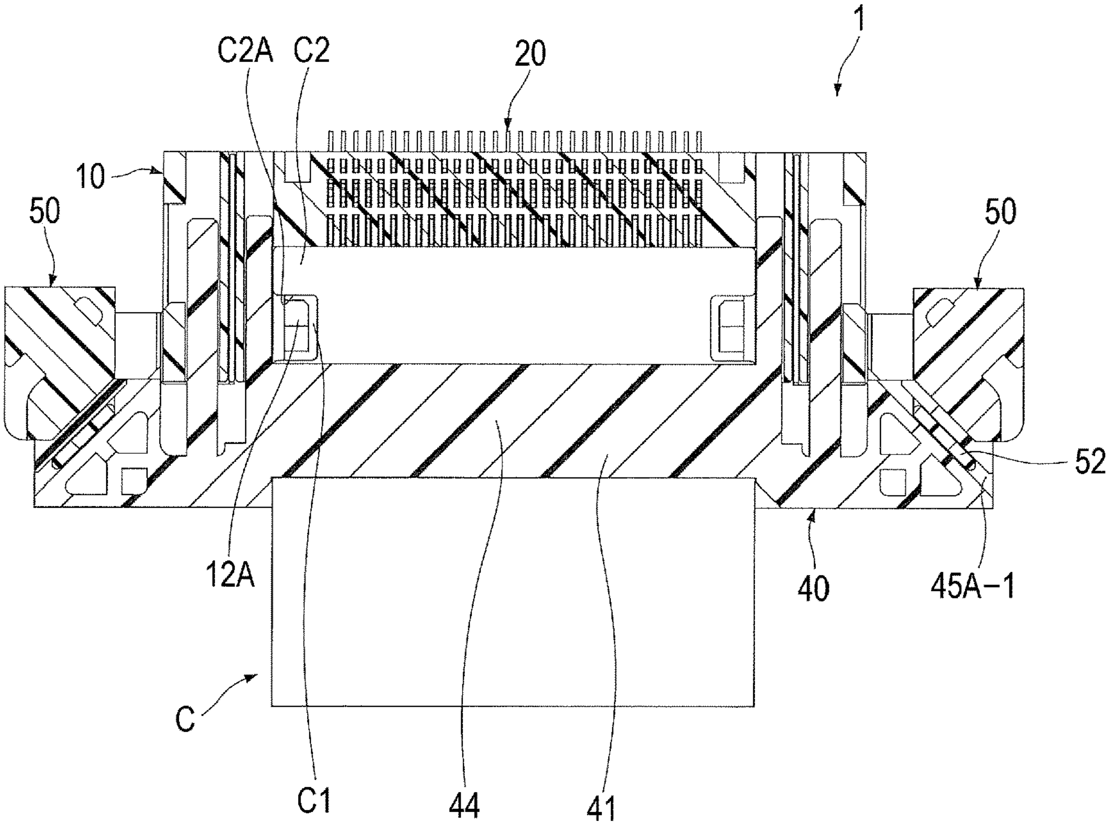

At each end portion of the flat conductor C in the connector width direction, the ear portion C2 (FIG. 1) is guided by the inclined surface 12A-1 of the locking protruding portion 12A of the housing 10, and is moved onto the upper end surface of the locking protruding portion 12A. Thereafter, the ear portion C2 further moves forward, and passes the position of the locking protruding portion 12A. Then, as shown in FIG. 6B, the ear portion C2 moves onto the upper end surface of the lower abutting portion 42A of the slider 40. When insertion of the flat conductor C is completed, the ear portion C2 of the flat conductor C is positioned on the front side with respect to the locking protruding portion 12A as viewed from above, as shown in FIG. 5B. In addition, the cutout portion C1 is positioned so as to surround the locking protruding portion 12A.

Moreover, when insertion of the flat conductor C is completed, the upper abutting portion 44 of the slider 40 presses the upper surface of the flat conductor C downward at the position on the back side with respect to the locking protruding portions 12A of the housing 10, as shown in FIG. 6B. Thus, the flat conductor C is bent in a substantially crank shape in the thickness direction thereof, as shown in FIG. 6B.

Figure 7B:
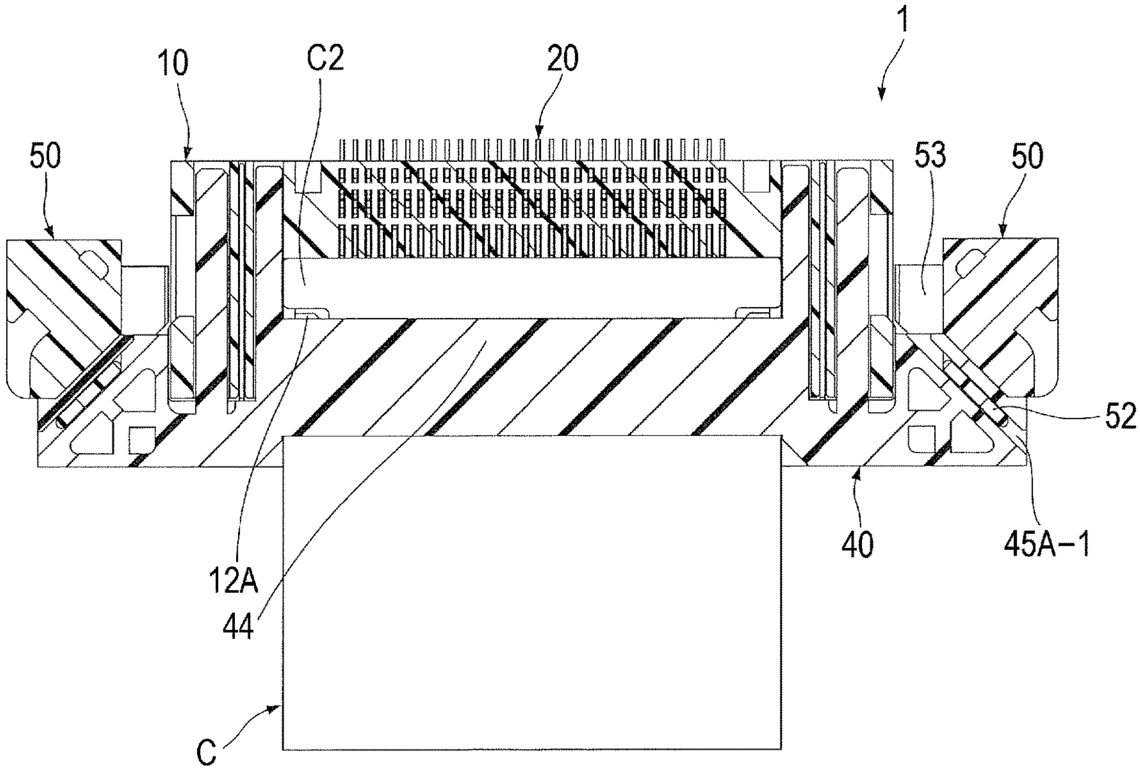
Figure 8A:
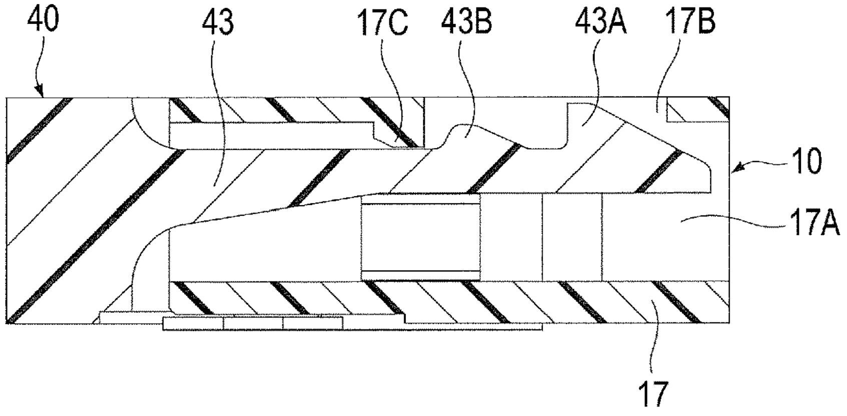
FIGS. 8A to 8C are longitudinal sectional views of the flat conductor electric connector of FIG. 7A, FIG. 8A showing a section at the position of the outer arm portion in the connector width direction, FIG. 8B showing a section at the position of the terminal in the connector width direction, and FIG. 8C showing a section at the position of the fitting detection member in a plane along the movement direction of the fitting detection member.

Next, the slider 40 is pushed in forward, and moves to the advance position shown in FIGS. 7A, 7B, 8A, and 8B. In this manner, the slider 40 is fitted in the housing 10 from the back. At this time, the fitting detection members 50 are still at the standby position as shown in FIG. 8C. In a course of the slider 40 moving toward the advance position, the inclined surface (upper surface) of the back claw portion 43B of the outer arm portion 43 abuts the slider locking portion 17C of the housing 10 from the back. Accordingly, the outer arm portion 43 elastically displaces downward, and therefore, further forward movement of the slider 40 is allowed. The back claw portion 43B passes the position of the slider locking portion 17C, and is positioned in front of the slider locking portion 17C. As a result, as shown in FIG. 8A, the slider 40 is arranged at the advance position. At the advance position, the back claw portion 43B can be locked to the slider locking portion 17C from the front. Thus, backward movement of the slider 40 is restricted.

In association with forward movement of the slider 40, the lower abutting portions 42A (second abutting portions) of the slider 40 move forward beyond the flat conductor C. Accordingly, the flat conductor C on the upper end surfaces of the lower abutting portions 42A (see FIG. 4B) before movement of the slider 40 moves down and is arranged on the lower inner wall surface of the receiving portion 13 of the housing 10. As a result, the locking protruding portions 12A of the housing 10 each enter the cutout portions C1 (FIG. 1) of the flat conductor C from below. In addition, the ear portions C2 of the flat conductor C are positioned, in front of the locking protruding portions 12A, in an area overlapping with the locking protruding portions 12A in the upper-lower direction. Thus, the locking target portions C2A of the flat conductor C can be each locked to the locking protruding portions 12A from the front.

As shown in FIG. 7B, both end portions of the upper abutting portion 44 of the slider 40 in the connector width direction are positioned above the locking protruding portions 12A so as to partially overlap with the locking protruding portions 12A in the front-back direction. At such a position, the upper abutting portion 44 abuts the upper surface of the flat conductor C to restrict upward movement of the flat conductor C. Thus, the locking target portions C2A of the flat conductor C are maintained at such positions that the locking target portions C2A can be locked to the locking protruding portions 12A.

Figure 8B:
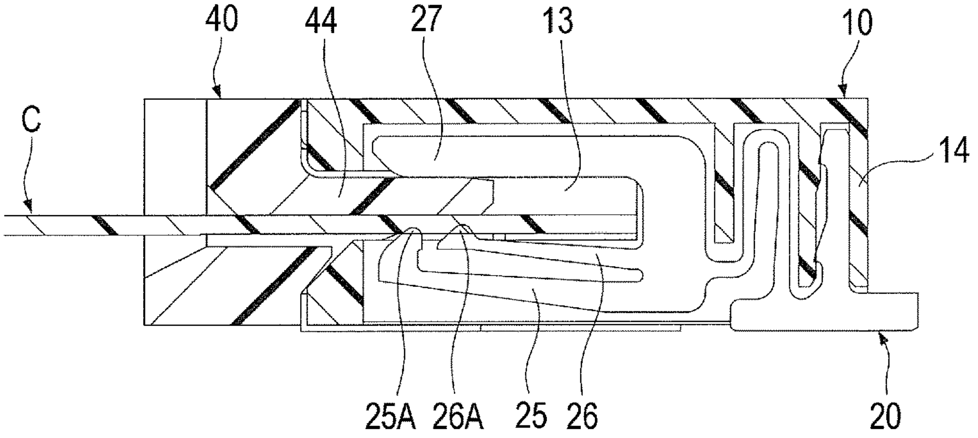
Figure 8C:
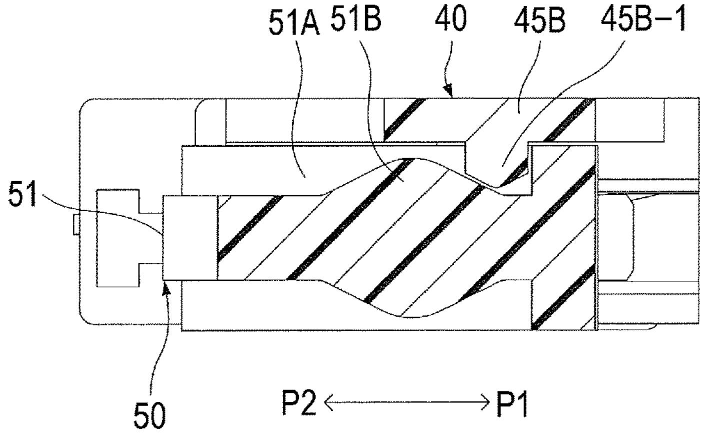
Figure 9A:
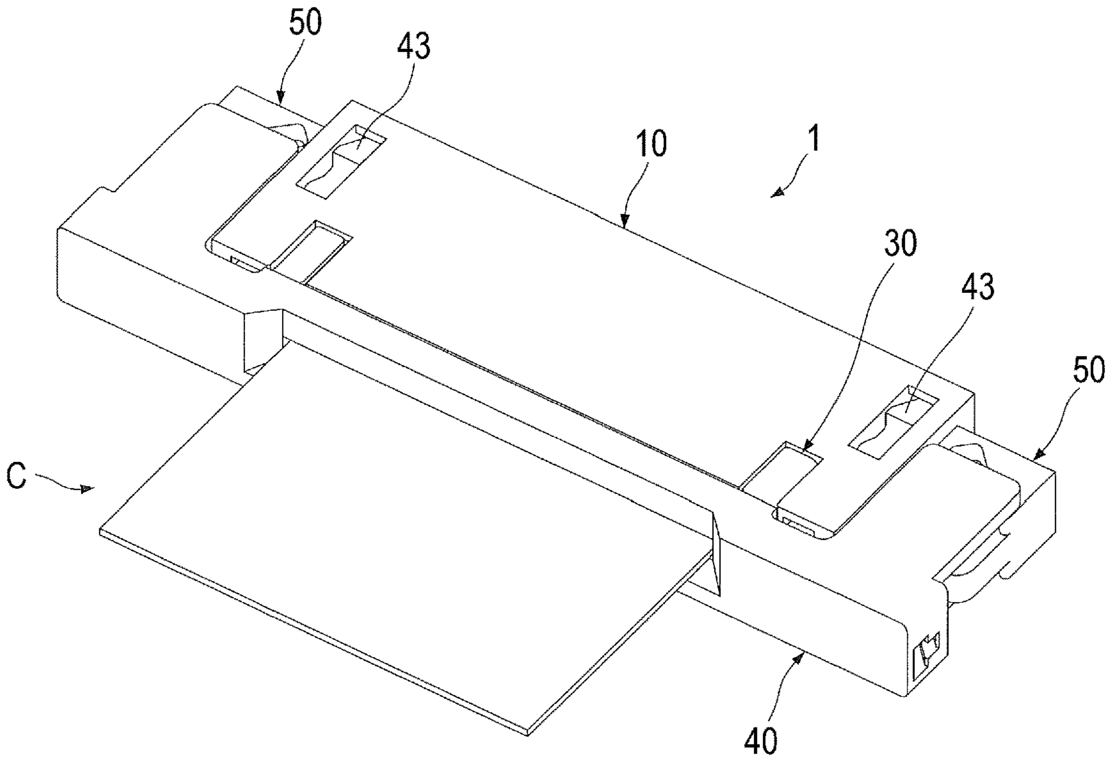
FIGS. 9A and 9B are views showing, together with the flat conductor, the flat conductor electric connector, FIG. 9A being a perspective view of a state upon completion of connection of the flat conductor and FIG. 9B being a cross-sectional view of the section of FIG. 9A at the position of the guide groove portion in the upper-lower direction.
Figure 9B:
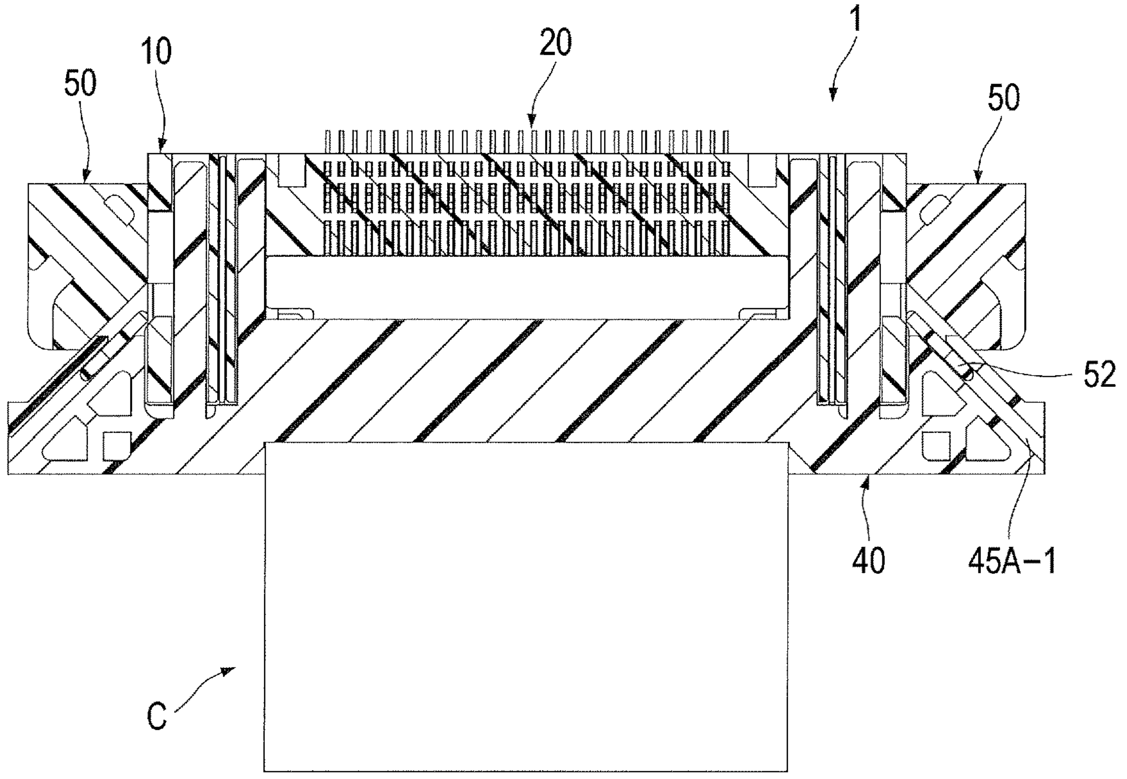

As shown in FIG. 8B, in the terminal arrangement area in the connector width direction, the upper abutting portion 44 of the slider 40 enters a clearance between the pressing arm portion 27 of the terminal 20 and the flat conductor C. At this time, the upper abutting portion 44 receives the downward pressing force from the pressing arm portion 27. Such pressing force is transmitted to the flat conductor C through the upper abutting portion 44. Thus, the contact portions 25A, 26A are further pressed by the flat conductor C. Then, the contact arm portions 25, 26 elastically displace downward. As a result, the contact portions 25A, 26A contact the circuit portion of the flat conductor C, and apply the contact pressure to the circuit portion from below. Then, the upper abutting portion 44 and the flat conductor C are sandwiched between the pressing arm portion 27 and the contact arm portions 25, 26. In the terminal arrangement area, upward movement of the flat conductor C is restricted by abutting of the upper abutting portion 44 with the upper surface of the flat conductor C. Note that FIG. 8B shows the contact arm portions 25, 26 which are not elastically displaced. However, the contact arm portions 25, 26 are actually elastically displaced downward (the same also applies to FIG. 10B).

As described above, in the present embodiment, the terminal 20 is provided with the pressing arm portion 27 so that the pressure of contact between the contact portions 25A, 26A and the circuit portion of the flat conductor C can be increased. Thus, a state of the flat conductor C being sandwiched is maintained even when the elastic portion 28 and the contact arm portions 25, 26 are elastically displaced so as to follow vibration received by the connector 1 from the outside upon use of the connector 1. As a result, a state of the contact portions 25A, 26A and the circuit portion of the flat conductor C contacting each other with a high contact pressure can be favorably maintained.

Figure 10A:
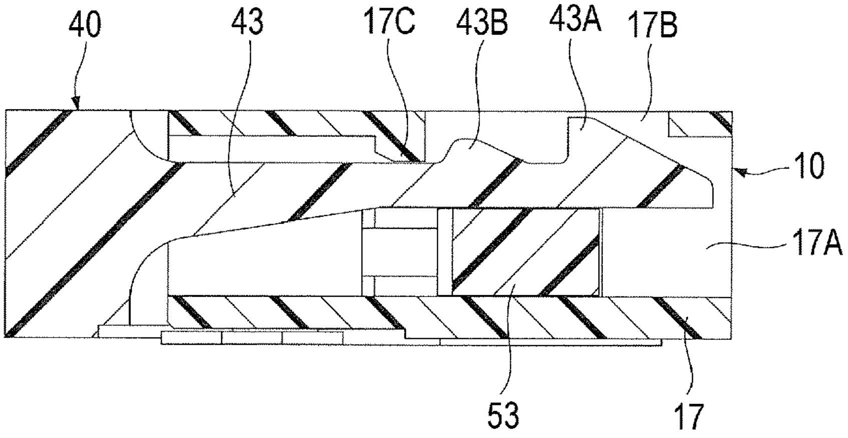
FIGS. 10A to 10C are longitudinal sectional views of the flat conductor electric connector of FIG. 9A, FIG. 10A showing a section at the position of the outer arm portion in the connector width direction, FIG. 10B showing a section at the position of the terminal in the connector width direction, and FIG. 10C showing a section at the position of the fitting detection member in a plane along the movement direction of the fitting detection member.
Figure 10B:
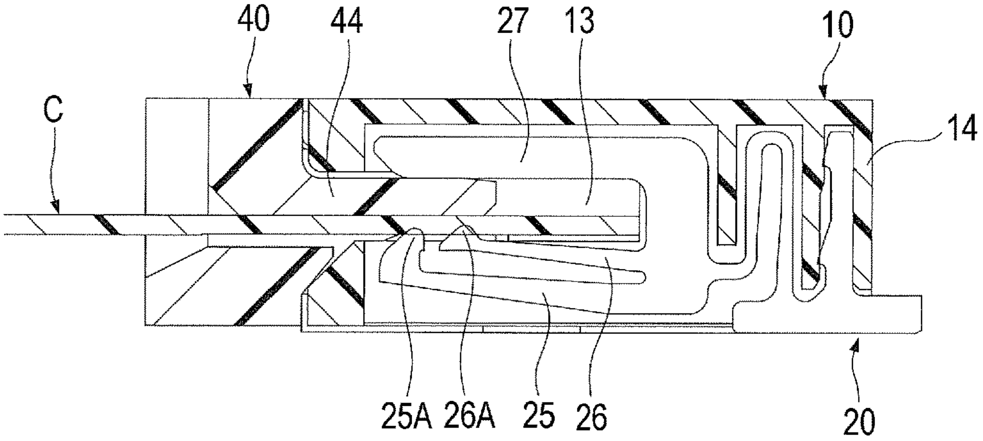
Figure 10C:
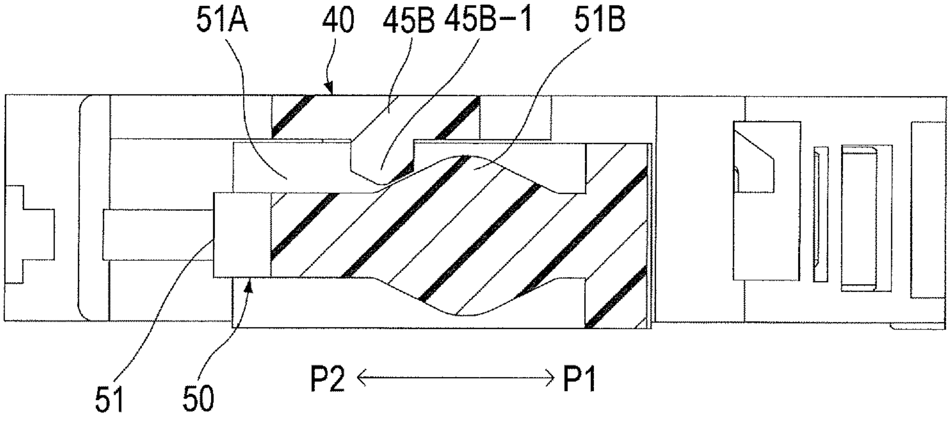
Figure 11B:
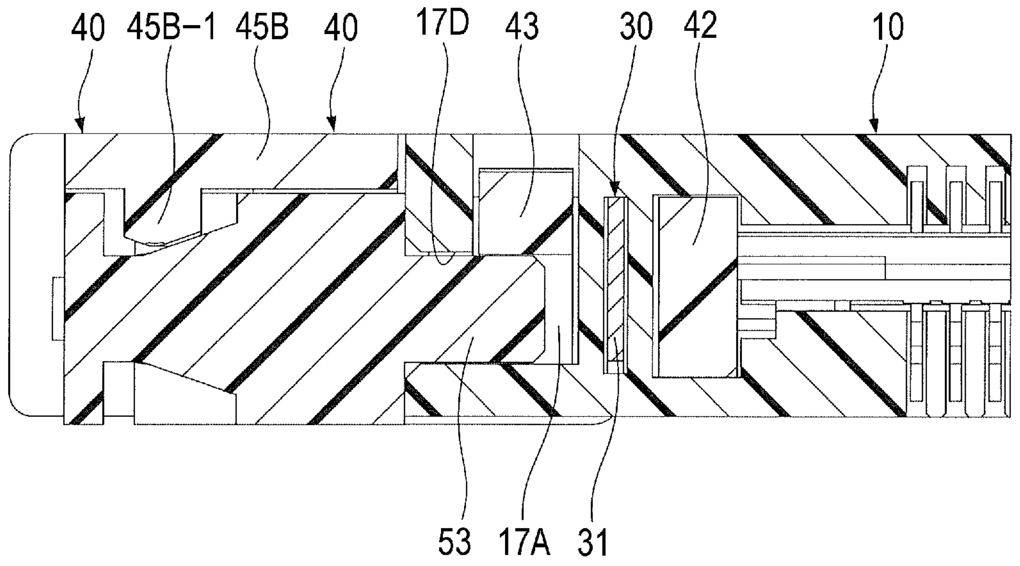

Next, the fitting detection member 50 at the standby position is pushed diagonally forward (P1 direction), i.e., forward and inward in the connector width direction, and moves to the detection position shown in FIGS. 9A, 9B, 10C, and 11B. At this time, the positioning protruding portion 45B-1 of the slider 40 moves over the bulging portion 51B of the fitting detection member 50. Accordingly, the fitting detection member 50 is allowed to reach the detection position. When the fitting detection member 50 is at the detection position, as illustrated in FIG. 11B, the restriction portion 53 reaches the position immediately below the outer arm portion 43 through the side hole portion 17D of the housing 10. Thus, the restriction portion 53 is positioned so as to abut the outer arm portion 43 from below, and restricts downward elastic displacement of the outer arm portion 43 (also see FIG. 10A).

As described above, downward elastic displacement of the outer arm portion 43 is restricted by the restriction portion 53. Then, as shown in FIG. 10A, the back claw portion 43B of the outer arm portion 43 can be locked to the slider locking portion 17C of the housing 10 from the front. In the present embodiment, such a state is favorably maintained. Thus, unnecessary movement of the slider 40 to the retreat position can be reliably reduced. Consequently, a state of the upper abutting portion 44 of the slider 40 restricting upward movement of the flat conductor C and therefore a state of the locking target portion C2A of the flat conductor C being lockable to the locking protruding portion 12A of the housing 10 from the front are favorably maintained. Thus, if unnecessary backward external force acts on the flat conductor C connected to the connector 1, the flat conductor C is less likely to be removed from the connector 1. By movement of the fitting detection members 50 to the detection position as described above, an operation of connecting the flat conductor C to the connector 1 is completed.

For example, a case where the slider 40 is not fully fitted in the housing 10 because the slider 40 does not reach the advance position, i.e., a case where the slider 40 is in a so-called half-fitted state, will be described. In this case, even if an attempt is made to move the fitting detection member 50 to the detection position later, the restriction portion 53 abutting the side surface of the housing 10 on the back side with respect to the side hole portion 17D blocks movement of the fitting detection member 50 to the detection position. Thus, an operator cannot move the fitting detection member 50 to the detection position. Consequently, the operator can easily recognize that the slider 40 is not fully moved to the advance position. In this state, the operator pushes the slider 40 forward again so that the slider 40 can fully reach the advance position. Thereafter, the operator may perform an operation of moving the fitting detection member 50 to the detection position.

In the present embodiment, the terminal 20 is provided with the elastic portion 28. Thus, when the connector 1 receives vibration from the outside, not only the contact arm portions 25, 26 but also the elastic portion 28 of the terminal 20 are elastically displaced. That is, in the present embodiment, the elastically-displaceable portion is provided longer than that in a case where only the contact arm portion is elastically displaceable. Thus, even when the connector 1 receives vibration with a high frequency from the outside, the contact arm portions 25, 26 are displaced together with the elastic portion 28, and easily follow such vibration. As a result, fine sliding contact between the contact arm portions 25, 26 and the circuit portion of the flat conductor C and therefore generation of metal powder due to such sliding contact can be avoided. Thus, the state of electric conduction between the contact portion and the circuit portion can be easily maintained.

In a case where the contact arm portions 25, 26 are displaced together with the elastic portion 28, the direction of displacement of the contact arm portions 25, 26 and the direction of displacement of the elastic portion 28 are not always coincident with each other. For example, when the elastic portion 28 is displaced in the front-back direction such that the substantially inverted U-shaped portion thereof is opened or closed, the contact arm portions 25, 26 may be displaced in the upper-lower direction. At this time, not only the contact arm portions 25, 26 but also the entirety of portions (base arm portion 24, contact arm portions 25, 26, and pressing arm portion 27) provided on the back side with respect to the elastic portion 28 may be displaced with a displacement component in the upper-lower direction so as to rotate with the coupling portion between the base arm portion 24 and the back leg portion 28B as the point of support.

Note that in the present embodiment, the elastic portion 28 is elastically displaceable in three directions of the front-back direction, the connector width direction, and the upper-lower direction. Note that it is not essential that the elastic portion is elastically displaceable in all the three directions. For example, in a case where the connector is used mainly under environment where vibration in the front-back direction easily occurs, an elastic portion elastically displaceable mainly in the front-back direction may be provided for the terminal.

In a case of removing the flat conductor C inserted into and connected to the connector 1, the slider 40 is moved backward to the retreat position with removal force greater than locking force between the back claw portion 43B of the slider 40 and the slider locking portion 17C of the housing 10. As a result, the upper abutting portion 44 and the lower abutting portions 42A of the slider 40 move backward. At this time, the upper abutting portion 44 is moved to such a position that upward movement of the flat conductor C is not restricted. Moreover, the lower abutting portions 42A are moved to such positions that the lower abutting portions 42A abut the lower surface of the flat conductor C. At this time, the lower abutting portions 42A are positioned within the area overlapping with the locking protruding portions 12A in the front-back direction.

In the present embodiment, the back portion of the lower abutting portion 42A is formed with the inclined surface 42A-1. Thus, when the slider 40 moves backward to the retreat position, the lower abutting portion 42A can easily move to below the flat conductor C from the front. In other words, the flat conductor C is smoothly guided by the inclined surfaces 42A-1, and is easily arranged on the upper end surfaces of the lower abutting portions 42A. As a result, the locking target portions C2A of the flat conductor C can be easily lifted to positions higher than the locking protruding portions 12A of the housing 10, i.e., positions at which the locking target portions C2A are not locked to the locking protruding portions 12A. Only by pulling the flat conductor C backward, the flat conductor C can be easily removed from the connector 1.

In the present embodiment, at the retreat position, the upper abutting portion 44 is positioned on the back side with respect to the locking protruding portion. Thus, upon removal of the flat conductor C, the upper abutting portion 44 is less likely to contact the upper surface of the flat conductor C. As a result, the flat conductor C can be easily removed.

In the present embodiment, the lower abutting portion 42A is positioned outside the locking protruding portion 12A in the connector width direction. Further, the lower abutting portion 42A is provided, at the retreat position, at the position within the area overlapping with the locking protruding portion 12A in the front-back direction. Thus, when the slider 40 is moved to the retreat position, the lower abutting portions 42A can approach the locking protruding portions 12A in the front-back direction without contacting the locking protruding portions 12A. Consequently, the lower abutting portions 42A can more reliably lift the flat conductor C to such a position that the flat conductor C is not locked to the locking protruding portions 12A.

Figure 12A:
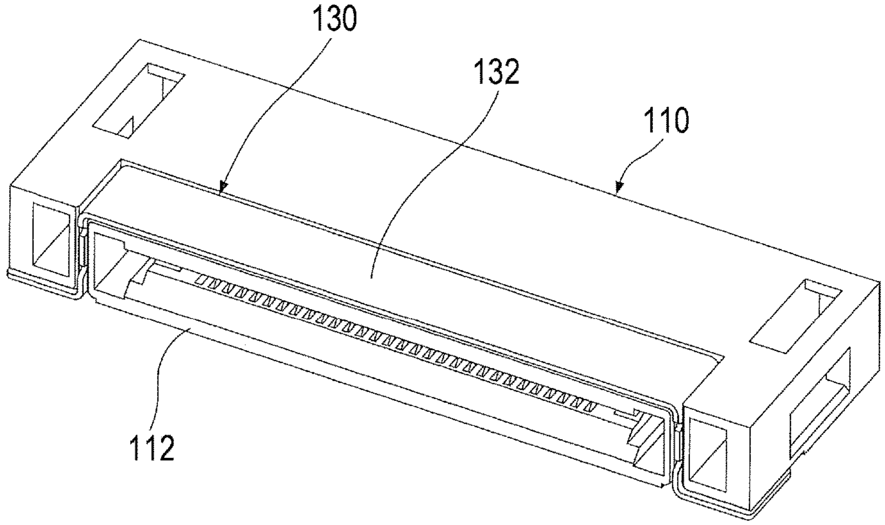
FIGS. 12A and 12B are perspective views of a housing and a reinforcing fitting according to a modification, FIG. 12A showing the reinforcing fitting attached to the housing and FIG. 12B showing the reinforcing fitting separated from the housing.
Figure 12B:
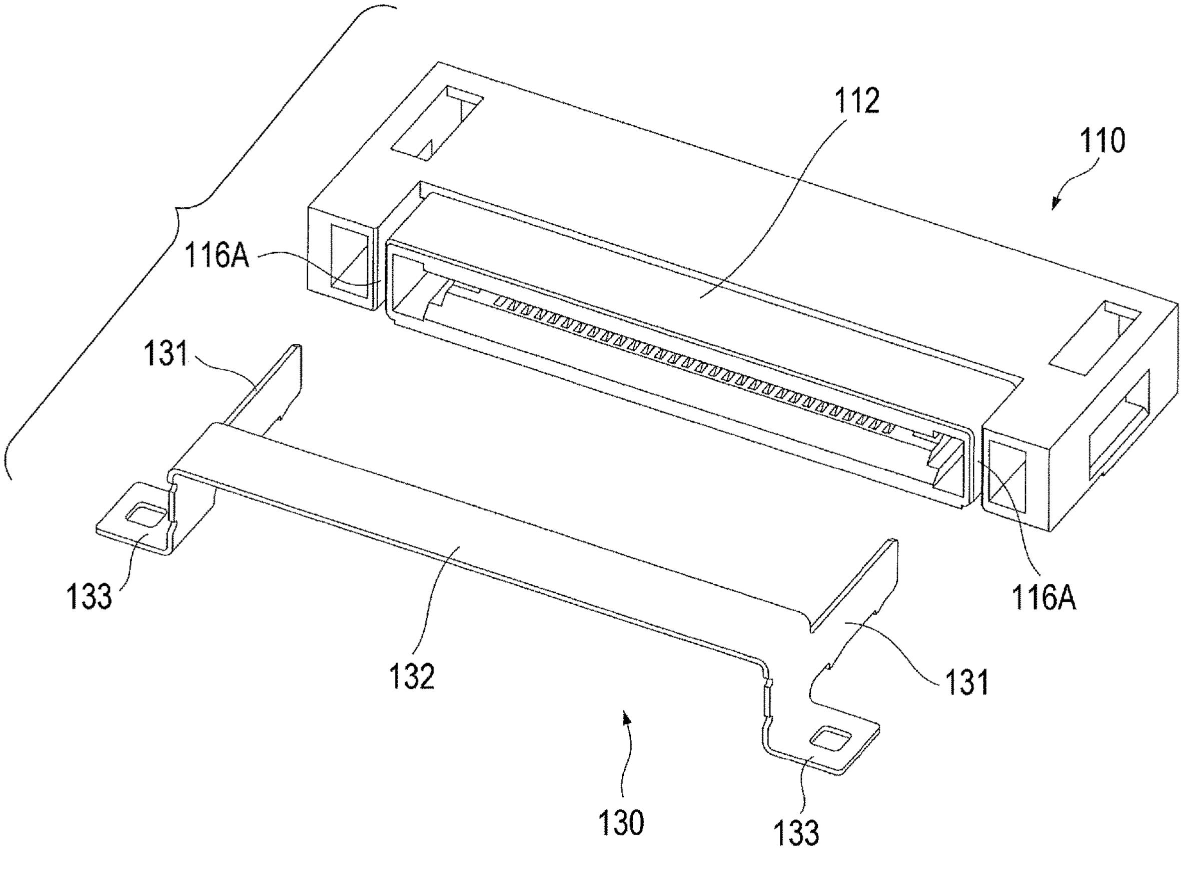

In the present embodiment, the fitting portion 12 of the housing 10 is provided, on each end side in the connector width direction, the reinforcing fitting 30 which is one independent member. Note that as a modification, only one reinforcing fitting extending over the entire area of the fitting portion 12 in the connector width direction may be provided as shown in FIG. 12A. FIGS. 12A and 12B are perspective views of a housing 110 and a reinforcing fitting 130 according to the modification of the present embodiment. FIG. 12A shows the reinforcing fitting 130 attached to the housing 110. FIG. 12B shows the reinforcing fitting 130 separated from the housing 110. In this modification, configurations different from those of the connector 1 of the above-described embodiment will be mainly described. Reference numerals obtained by adding "100" to the reference numerals in the above-described embodiment are used to represent the same components as those of the above-described embodiment, and detailed description thereof will be omitted.

In this modification, the reinforcing fitting 130 is configured such that the upper plate portions 32 of the two reinforcing fittings 30 in the above-described embodiment are extended and coupled to each other, as shown in FIG. 12B. As a result, the reinforcing fitting 130 includes the integrated two reinforcing fittings 30. In the housing 110, the upper surface of a fitting portion 112 is positioned lower than the upper surfaces of other portions of the housing 110 by the thickness dimension of an upper plate portion 132 of the reinforcing fitting 130. Holding target arm portions 131 provided at both ends of the reinforcing fitting 130 in the connector width direction are press-fitted in vertical groove portions 116A of the housing 110 from the back. In this manner, the reinforcing fitting 130 is attached to the housing 110.

The reinforcing fitting 130 attached to the housing 110 covers, at the upper plate portion 132, the upper surface of the fitting portion 112 as shown in FIG. 12A. As in the upper plate portion 32 of the reinforcing fitting 30 of the above-described embodiment, the upper plate portion 132 is configured to restrict upward movement of the fitting portion 112. In the present modification, the upper plate portion 132 extends over the entire area of the fitting portion 112 in the connector width direction. As a result, a sufficient area for contact with the upper surface of the fitting portion 112 is ensured. Thus, upward movement of the fitting portion 112 can be more reliably restricted. Moreover, in this modification, both end portions of the upper plate portion 132 in the connector width direction are coupled to fixing portions 133 to be soldered to the circuit board through back portions of the holding target arm portions 131. That is, the upper plate portion 132 is fixed in a double-supported beam shape. Thus, upward movement of the fitting portion 112 can be more reliably restricted. Consequently, even when unnecessary external force acting on the flat conductor C inserted into and connected to the connector is transmitted upward to the upper wall of the fitting portion 112, detachment of the connector 1 from the circuit board can be favorably reduced.

In the present embodiment, the pressing arm portion 27 of the terminal 20 indirectly presses the flat conductor C from above through the upper abutting portion 44 of the slider 40. Instead, the pressing arm portion may directly press the upper surface of the flat conductor.

In the present embodiment, one fitting detection member 50 is provided for each side of the slider 40 in the connector width direction. Instead, one fitting detection member 50 may be provided only for one end side.

In the present embodiment, the fitting detection member 50 moves in the direction which is parallel with the surface (XY plane) of the flat conductor C and is inclined with respect to the front-back direction (X-axis direction). Instead, in a case where there is a sufficient space around the connector 1 in the upper-lower direction, the fitting detection member may be provided so as to move in the upper-lower direction. In this case, the slider includes an elastic arm portion elastically displaceable in the connector width direction. When the fitting detection member moves upward or downward and reaches the detection position, the restriction portion of the fitting detection member is positioned so as to abut the elastic arm portion by way of the opening formed in the housing.

In a case where there is a sufficient space around the connector 1 in the connector width direction, the fitting detection member may be provided so as to move only in the connector width direction. In this case, the slider includes an elastic arm portion elastically displaceable in the upper-lower direction. When the fitting detection member moves inward in the connector width direction and reaches the detection position, the restriction portion of the fitting detection member is positioned so as to abut the elastic arm portion by way of the opening formed in the housing.

In the present embodiment, in the housing 10, the locking protruding portion is formed as the locking protruding portion 12A protruding upward from the lower inner wall surface of the receiving portion 13. Moreover, in the slider 40, the first abutting portion is formed as the upper abutting portion 44 configured to abut, at the advance position, the upper surface of the flat conductor inserted into and connected to the connector. Further, the second abutting portion is formed as the lower abutting portion 42A configured to abut, at the retreat position, the lower surface of the flat conductor. However, the positions (locking positions) of the locking protruding portion, the first abutting portion, and the second abutting portion are not limited to those of the example of the present embodiment. As a modification, the locking positions may be those obtained by vertically inverting the positions of the present embodiment, for example. Specifically, in the housing, the locking protruding portion may be formed as a locking protruding portion protruding downward from the upper inner wall surface of the receiving portion. Moreover, in the slider, the first abutting portion may be formed as a lower abutting portion configured to abut, at the advance position, the lower surface of the flat conductor. Further, the second abutting portion may be formed as an upper abutting portion configured to abut, at the retreat position of the slider, the upper surface of the flat conductor.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A flat conductor electric connector configured such that a flat conductor extending in a front-back direction is inserted and connected forward to the flat conductor electric connector, comprising:

a plurality of terminals arrayed in a flat conductor width direction which is a terminal alignment direction; and a housing holding the plurality of terminals, wherein each terminal includes an attachment portion attached, on one end side, in a fixed manner to the housing, a contact arm portion extending in the front-back direction on the other end side and contacting a circuit portion of the flat conductor, and an elastically-displaceable elastic portion provided between the attachment portion and the contact arm portion, the elastic portion is elastically displaceable at least in one of the front-back direction, the terminal alignment direction, or an upper-lower direction which is a flat conductor thickness direction, the contact arm portion is elastically displaceable at least in the upper-lower direction, and when the elastic portion is elastically displaced, is displaceable together with the elastic portion, the contact arm portion includes an upper contact arm portion and a lower contact arm portion provided lower than the upper contact arm portion in the upper-lower direction, and the upper contact arm portion and the lower contact arm portion are configured to contact the circuit portion of the flat conductor from below in the upper-lower direction with contact pressure while elastically displacing downward in the upper-lower direction.

2. The flat conductor electric connector according to claim 1, wherein the elastic portion has a bent portion bent at an intermediate position in a longitudinal direction of the elastic portion.

3. The flat conductor electric connector according to claim 1, wherein each terminal includes a pressing portion, and on an opposite side of the flat conductor from the contact arm portion in the upper-lower direction, the pressing portion directly or indirectly presses the flat conductor toward the contact arm portion.

4. The flat conductor electric connector according to claim 2, wherein each terminal includes a pressing portion, and on an opposite side of the flat conductor from the contact arm portion in the upper-lower direction, the pressing portion directly or indirectly presses the flat conductor toward the contact arm portion.

5. A flat conductor electric connector configured such that a flat conductor extending in a front-back direction is inserted and connected forward to the flat conductor electric connector, comprising:

a plurality of terminals arrayed in a flat conductor width direction which is a terminal alignment direction; and a housing holding the plurality of terminals, wherein each terminal includes an attachment portion attached, on a front side in the front-back direction, in a fixed manner to the housing, a contact arm portion extending in the front-back direction and contacting a circuit portion of the flat conductor on a back side in the front-back direction, and an elastically-displaceable elastic portion provided between the attachment portion and the contact arm portion in the front-back direction, the elastic portion is elastically displaceable at least in one of the front-back direction, the terminal alignment direction, or an upper-lower direction which is a flat conductor thickness direction, the contact arm portion is elastically displaceable at least in the upper-lower direction, and when the elastic portion is elastically displaced, is displaceable together with the elastic portion, and the elastic portion includes a front leg portion positioned on the front side and extending in the upper-lower direction, a back leg portion positioned on the back side and extending in the upper-lower direction, and a bent portion bent downward in the upper-lower direction and coupling upper end portions of the front leg portion and the back leg portion to each other.

6. The flat conductor electric connector according to claim 5, wherein the bent portion is bent at an intermediate position in a longitudinal direction of the elastic portion.

7. The flat conductor electric connector according to claim 5, wherein each terminal includes a pressing portion, and on an opposite side of the flat conductor from the contact arm portion in the upper-lower direction, the pressing portion directly or indirectly presses the flat conductor toward the contact arm portion.

8. The flat conductor electric connector according to claim 6, wherein each terminal includes a pressing portion, and on an opposite side of the flat conductor from the contact arm portion in the upper-lower direction, the pressing portion directly or indirectly presses the flat conductor toward the contact arm portion.

* * * * *